US008881616B2

(12) United States Patent
Dize et al.

(10) Patent No.: US 8,881,616 B2

(45) Date of Patent: Nov. 11, 2014

(54) HIGH DEGREE OF FREEDOM (DOF) CONTROLLER

(75) Inventors: Chad Alan Dize, Arlington, VA (US); Daniel R. Wahl, Alexandria, VA (US); Thomas W. Van Doren, Fredericksburg, VA (US)

(73) Assignee: HDT Robotics, Inc., Fredericksburg, VA (US)

( * ) Notice: Subject to any disclaimer, the term of this patent is extended or adjusted under 35 U.S.C. 154(b) by 330 days.

(21) Appl. No.: 13/045,665

(22) Filed: Mar. 11, 2011

(65) Prior Publication Data

US 2011/0219899 A1 Sep. 15, 2011

Related U.S. Application Data

(60) Provisional application No. 61/312,700, filed on Mar. 11, 2010.

(51) Int. Cl.
*G06F 3/033* (2013.01)
*G05G 9/047* (2006.01)

(52) U.S. Cl.
CPC ............ *G05G 9/047* (2013.01); *G05G 9/04788* (2013.01)
USPC ...................................... 74/471 XY; 345/161

(58) Field of Classification Search
USPC ............... 74/741 XY, 743; 345/161, 156, 184
See application file for complete search history.

(56) References Cited

U.S. PATENT DOCUMENTS

| | | | | |
|---|---|---|---|---|
| 3,028,126 | A * | 4/1962 | Holleman | 244/236 |
| 4,216,467 | A * | 8/1980 | Colston | 341/20 |
| 4,895,039 | A * | 1/1990 | Hegg | 74/471 XY |
| 4,914,976 | A | 4/1990 | Wyllie | |
| 5,107,080 | A | 4/1992 | Rosen | |
| 5,503,040 | A * | 4/1996 | Wright | 74/471 XY |
| 5,854,622 | A | 12/1998 | Brannon | |
| 6,698,952 | B1 * | 3/2004 | Goddard | 400/88 |
| 6,893,320 | B2 * | 5/2005 | Caiozza | 446/456 |
| 7,138,981 | B2 | 11/2006 | Kim et al. | |
| 7,151,527 | B2 * | 12/2006 | Culver | 345/157 |
| 7,204,168 | B2 | 4/2007 | Najafi et al. | |
| 8,502,776 | B2 * | 8/2013 | Kamentser et al. | 345/161 |

(Continued)

FOREIGN PATENT DOCUMENTS

| | | |
|---|---|---|
| GB | 2 264 771 A | 9/1993 |
| GB | 2 264 771 A1 | 9/1993 |
| WO | WO 95/13576 | 5/1995 |

OTHER PUBLICATIONS

International Search Report of International Application No. PCT/US2011/028040, dated Jul. 11, 2011(English Text).

(Continued)

*Primary Examiner* — Troy Chambers
*Assistant Examiner* — Emily Cheng
(74) *Attorney, Agent, or Firm* — Fay Sharpe LLP

(57) ABSTRACT

A control actuator apparatus is presented having an actuator assembly providing three linear motion degrees of freedom relative to a base and three rotational degrees of freedom, and one or more additional actuators providing at least one additional degree of freedom, including a base structure, an XYZ stage, and an upper actuation assembly with a wrist angle stage, a forearm angle stage, and a digit angle stage providing relative positioning signals or values to facilitate machine control capabilities with a high number of degrees of freedom (high DoF).

19 Claims, 21 Drawing Sheets

(56) References Cited

U.S. PATENT DOCUMENTS

| | | | | |
|---|---|---|---|---|
| 2002/0175894 | A1* | 11/2002 | Grillo | 345/156 |
| 2006/0156848 | A1* | 7/2006 | Gosselin et al. | 74/471 XY |
| 2008/0193260 | A1 | 8/2008 | Yokokohji et al. | |
| 2009/0090208 | A1 | 4/2009 | Diccion | |
| 2010/0016766 | A1* | 1/2010 | Zhang et al. | 601/5 |

OTHER PUBLICATIONS

Written Opinion of International Application No. PCT/US2011/028040, dated Jul. 11, 2011(English Text).

International Preliminary Report on Patentability of International Application No. PCT/US2011/028040 dated Sep. 11, 2012.

* cited by examiner

HIGH DEGREE OF FREEDOM (DOF) CONTROLLER

REFERENCE TO RELATED APPLICATION

This application claims priority to and the benefit of U.S. Provisional Patent Application Ser. No. 61/312,700, filed Mar. 11, 2010, entitled HIGH DEGREE OF FREEDOM (DoF) CONTROL ACTUATOR, the entirety of which is hereby incorporated by reference.

FIELD OF THE DISCLOSURE

The present disclosure relates generally to machine control actuators and more particularly to a high degree of freedom control actuator.

BACKGROUND

Joysticks and other control actuators provide an interface allowing an operator to control of one or more functions of a machine, such as an aircraft, a crane, truck, underwater unmanned vehicle, wheelchair, surveillance camera, computer, etc. Conventional joysticks include a stick member pivotally mounted to a base and include components to generate signals indicating the stick's displacement from a neutral position. In addition, joystick controllers often include one or more button or knob-type actuators allowing an operator to initiate predefined machine functions, such as firing a weapon in a video game running on a computer or gaming machine. Typical joystick actuators, however, provide only a limited number of degrees of freedom (DoF), and thus are unable to implement more complicated operator interface challenges.

SUMMARY

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. A control actuator apparatus is disclosed, which provides relative positioning signals or values with a high number of degrees of freedom (e.g., a total of 11 degrees of freedom in certain embodiments) for improved machine control capabilities. The actuator apparatus can be employed in a variety of applications, for example, controlling operation of robotic machines deployed in dangerous and/or obscured locations unsuitable for humans, such as law enforcement, combat, fire-fighting situations or the like.

A high degree of freedom (DoF) control actuator is provided in accordance with one or more aspects of the disclosure, which has a base structure and an actuator assembly that provides three linear motion degrees of freedom. The actuator assembly includes actuators providing three rotational degrees of freedom, as well as one or more additional actuators providing one additional degree of freedom. In various embodiments, additional actuators are included which provide two, three, four, or five additional degrees of freedom.

In accordance with one or more aspects of the disclosure, a high DoF control actuator apparatus is provided, which includes a base, an XYZ stage, and an actuation assembly which provides eleven degrees of freedom relative to the base structure in certain embodiments, and provides signals or values indicating the position the operator's arm, hand, digit, and/or wrist. The XYZ stage is mounted to the base and includes a support structure movable in one or more of three orthogonal directions relative to the base structure. The XYZ stage provides one or more signals or values that indicate the position of the support structure relative to the base structure position in one or more of the three orthogonal directions.

The actuation assembly is supported on the XYZ stage and is movable by the operator's arm, hand, and/or wrist to provide at least four additional degrees of freedom relative to the base structure. In certain embodiments, the upper actuation assembly includes a wrist angle stage is pivotal about a first orthogonal direction relative to the XYZ stage by operator hand, forearm or wrist motion. The wrist angle stage, moreover, provides one or inure signals or values which indicate its pivotal position relative to the XYZ stage with respect to rotation about the first orthogonal directions. In certain embodiments, the actuation assembly includes a wrist deviation actuator pivotal about a second orthogonal direction by operator wrist motion relative to the wrist angle stage. The wrist deviation actuator provides signal(s) or value(s) indicating its pivotal position relative to the wrist angle stage. In certain embodiments, moreover, the actuation assembly provides a wrist pivot actuator. This actuator pivots about a third orthogonal directions by operator wrist flexion motion relative to the wrist angle stage, and provides one or more signals or values to indicate its pivotal position relative to the wrist angle stage.

In certain embodiments, moreover, the upper actuation assembly includes a digit angle stage with digit actuators individually movable by operator hand motion relative to the wrist angle stage. The digit angle stage provides signals or values indicating the position of at least one digit actuator relative to the wrist angle stage with respect to at least one of deflection of at least one of a finger flexion, a thumb flexion, and a thumb rotation of the operator's hand. The digit angle stage in certain implementations includes first and second finger actuators movable by first and second operator finger motion relative to the wrist angle stage, respectively. The digit angle stage provides at least one signal or value indicating the position of each of the first and second finger actuators relative to the wrist angle stage with respect to operator finger flexion.

Certain embodiments of the digit angle stage include a thumb actuator movable by thumb motion relative to the wrist angle stage. The digit angle stage in these embodiments provides one or more signals indicating the position of the thumb actuator relative to the wrist angle stage with respect to a thumb flexion and/or a thumb rotation of the operator's hand.

The upper actuation assembly in certain embodiments includes a forearm angle stage movable relative to the XYZ stage and relative to the wrist angle stage by operator forearm motion. The forearm angle stage provides at least one signal or value indicative of the position of the forearm angle stage relative to at least one of the XYZ stage and the wrist angle stage.

In certain embodiments, a toggle switch is provided, which is operable by thumb motion and which provides a signal or value indicating an actuation state of the toggle switch.

A dead man switch is provided in certain embodiments, which is operable by finger motion relative to the digit angle stage. The digit angle stage provides at least one signal or value indicative of an actuation state of the dead man switch.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

Figure 1A:
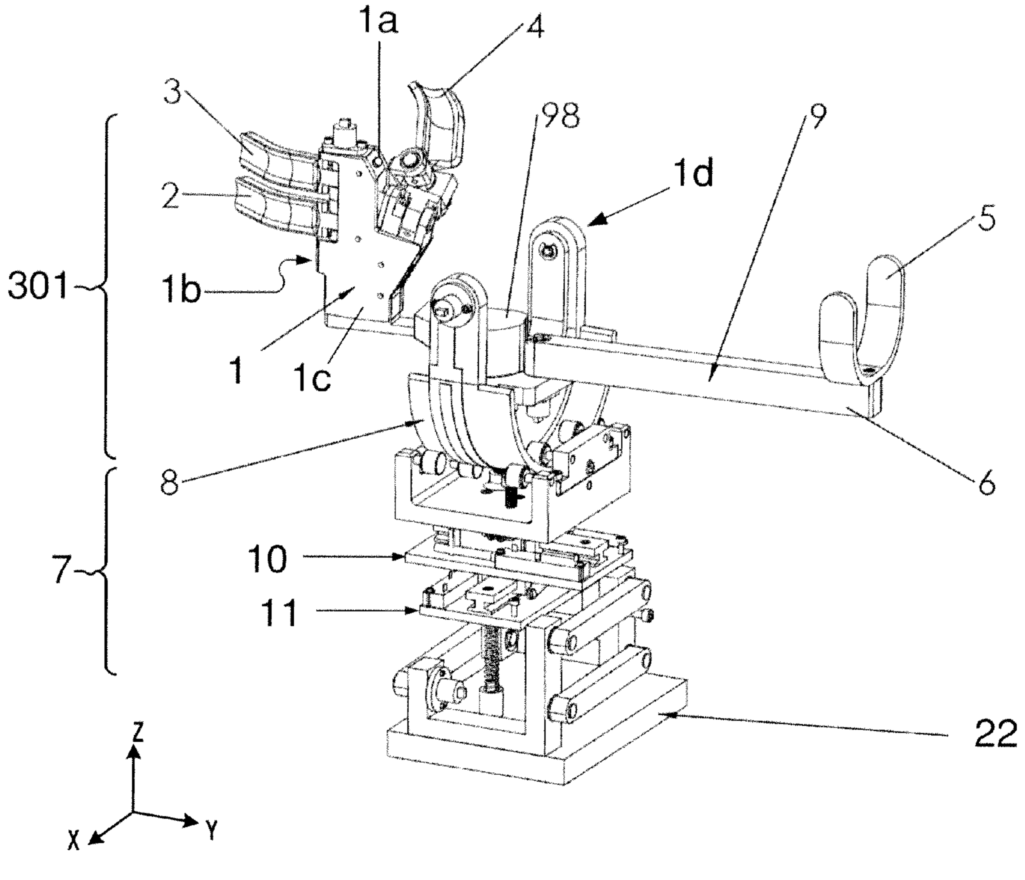
FIGS. 1A and 1B illustrate an 11 degree of freedom joystick assembly according to a first embodiment of the present disclosure.
Figure 1B:
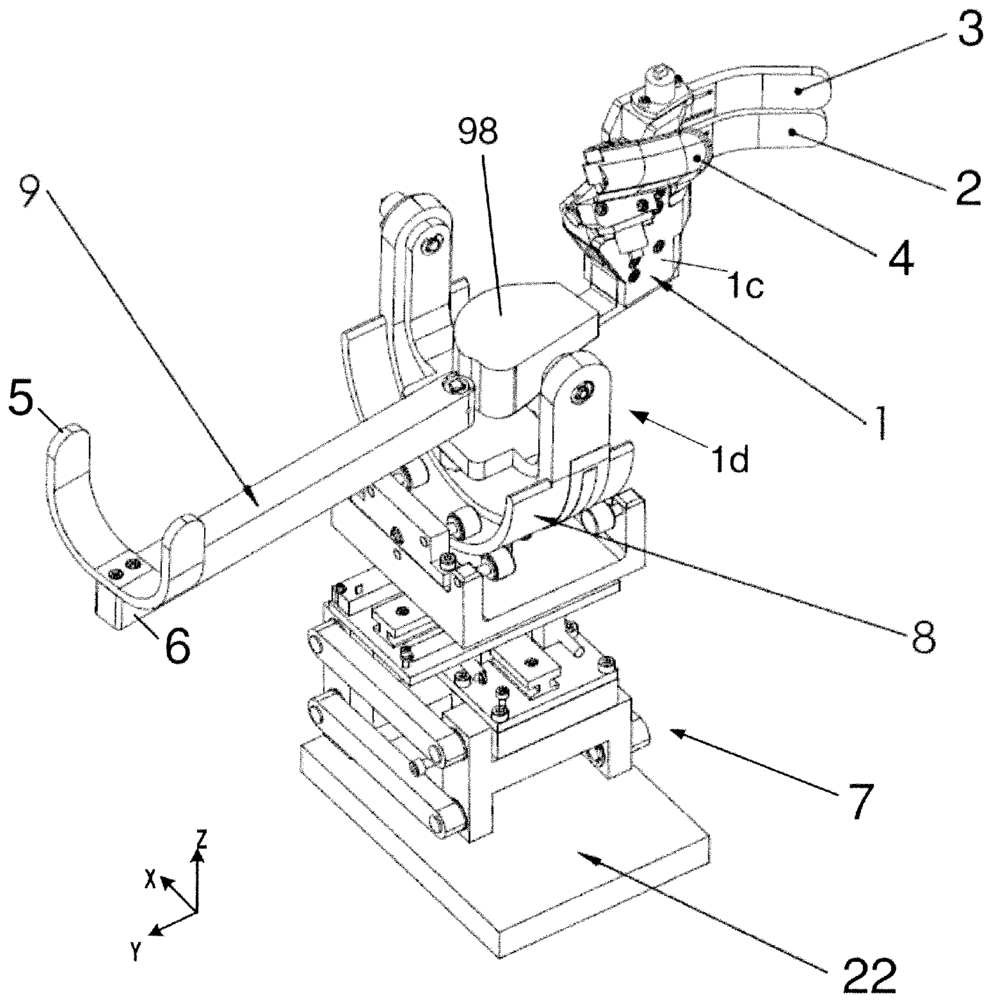

One or more embodiments or implementations are hereinafter described in conjunction with the drawings, where like reference numerals are used to refer to like elements throughout, and where the various features are not necessarily drawn to scale.

One embodiment of the high degree of freedom (DoF) control actuator apparatus or joystick is shown in FIGS. 1A through 20. As is shown in the drawings and particularly in FIG. 14, the joystick assembly comprises a digit angle stage 1, an XYZ stage 7, a wrist angle stage 8, and forearm angle stage 9.

The control actuator apparatus includes a base structure 22 to which is mounted an XYZ stage 7. The XYZ stage includes a support structure that is movable in orthogonal X, Y, and/or Z directions indicated in the figures relative to the base structure 22, and includes one or more sensors providing signals and/or values indicating the position of the support structure relative to that of the base 22 in the X. Y, and/or Z directions. The control apparatus also includes an upper actuation assembly 301 (numerically indicated in FIG. 2) supported on the XYZ stage 7. The upper actuation assembly 301 includes a wrist angle stage 8 movable relative to the XYZ stage 7 by operator hand, forearm or wrist motion, as well as a forearm angle stage 9 movable relative to the XYZ stage 7 and relative to the wrist angle stage 8 by operator forearm motion, and a digit angle stage 1 including at least one actuator 2, 3, and 4 movable by operator hand motion relative to the wrist angle stage 8.

The stages 1, 7, and 8 are provisioned with position indicating/measuring sensors of any suitable type or types to provide signals and/or values indicating the positioning of the operator's hand, wrist, and/or forearm. Suitable sensor types include without limitation potentiometers (pots), switches or switch arrays, linear-variable differential transformers (LVDTs), Hall effect sensors, electro-magnetic sensors such as proximity sensors, magnetic flux detectors, optical position sensors, or other sensors that provide one or more signals or values (analog and/or digital) indicating relative positioning (linear and/or rotational) of one or more actuator structures (tabs, members) and other structures or assemblies as described herein. The apparatus, moreover, can be coupled with any suitable form of wired and/or wireless means for providing such sensor signals and/or values to a controlled machine or other intermediate system, details of which are omitted in the figures so as not to obscure the illustrated structures.

In the illustrated embodiments, the wrist angle stage 8 includes one or more sensors that provide signals and/or values indicating the position of the wrist angle stage 8 with respect to rotation, flexion, and/or deviation. The forearm angle stage 9 is equipped with one or more sensors that provide signals and/or values indicating the position of the forearm angle stage 9 relative to the XYZ stage 7 and/or relative to the wrist angle stage 8. The digit angle stage 1 includes one or more sensors providing signals and/or values indicating the position of the actuators 2, 3, 4 relative to the digit angle stage 1 with respect to deflection of at least one of an index finger flexion, a middle finger flexion, a thumb flexion, and/or a thumb rotation of the operator's hand.

Figure 3A:
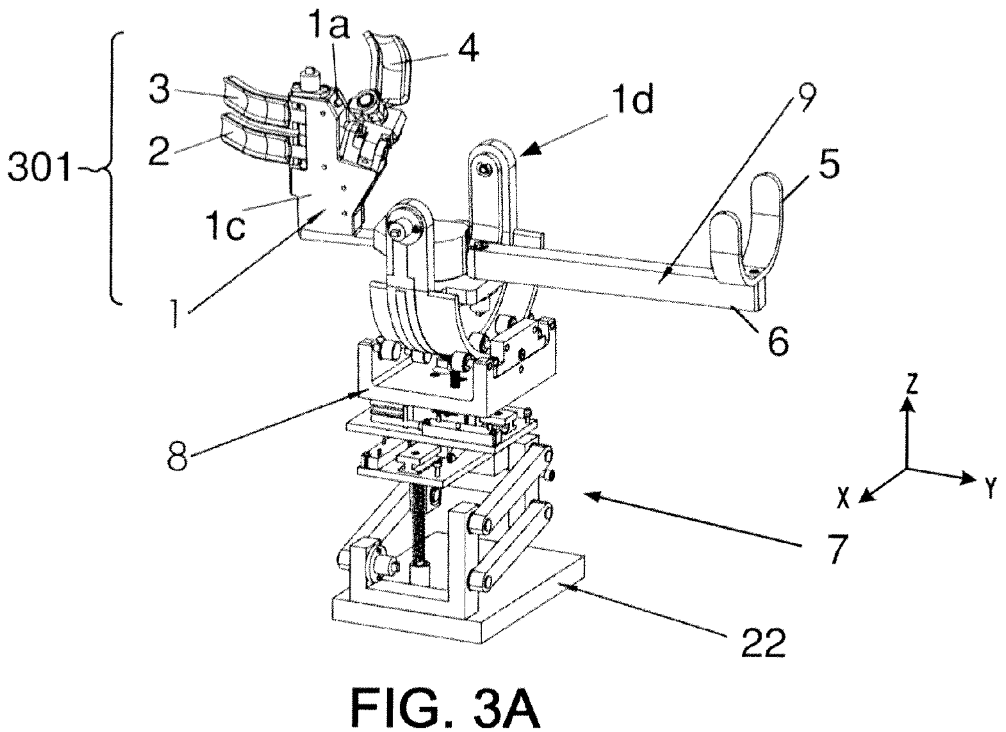
FIG. 3A illustrates an 11 degree of freedom joystick assembly with the Z degree of freedom extended to its maximum travel.
Figure 3B:
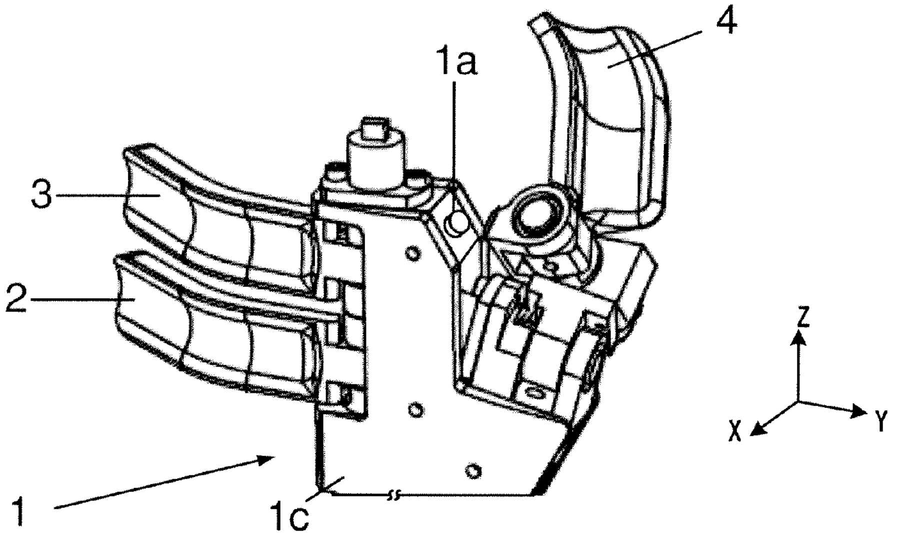
FIG. 3B illustrates a digit angle stage of the 11 degree of freedom joystick assembly with a toggle switch.

A toggle switch 1*a* is positioned toward the top rear of the digit angle stage 1 as best shown in FIG. 3B to provide the ability to change functional modes conveniently. This location is designated because its position is ergonomically advantageous, although other locations could be used. The toggle switch1*a* is operable by thumb motion relative to the digit angle stage 1, and the digit angle stage 1 provides one or more signals or values that indicate an actuation state of the toggle switch 1*a.*

Figure 3C:
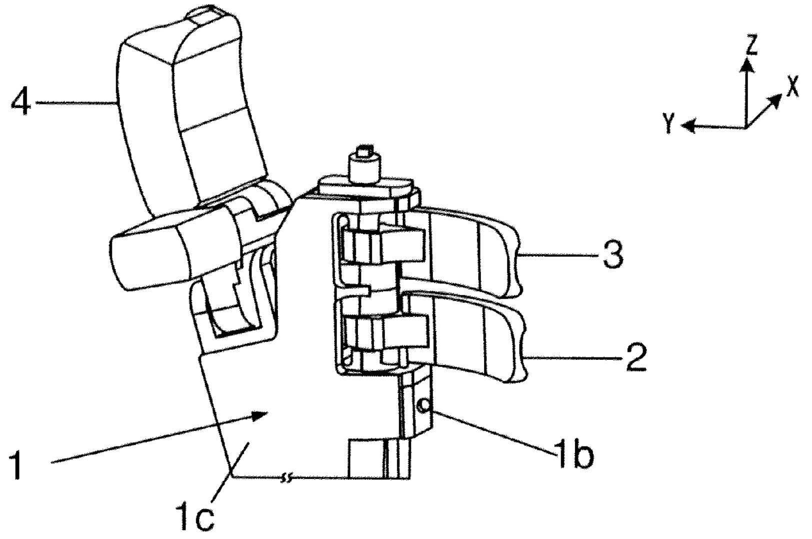
FIG. 3C illustrates the digit angle stage of the 11 degree of freedom joystick assembly with a dead man switch.

As also seen in FIG. 3C, the exemplary digit angle stage 1 also includes a dead man switch 1*b*, and the digit angle stage 1 provides one or more signals or values indicative of the actuation state of the dead man switch, for example, to inactivate control when the operator releases the joystick. This switch 1*b* in certain embodiments is located on the front of the digit stage as best shown in FIG. 3C, although other locations may be used.

In addition, certain embodiments of the disclosed control actuator apparatus include one or more force and/or torque producing components that operate to provide torque and/or force to one or more of the degree of freedom actuators. The apparatus may further comprise one or more tactile actuators and other feedback components.

Figure 2:
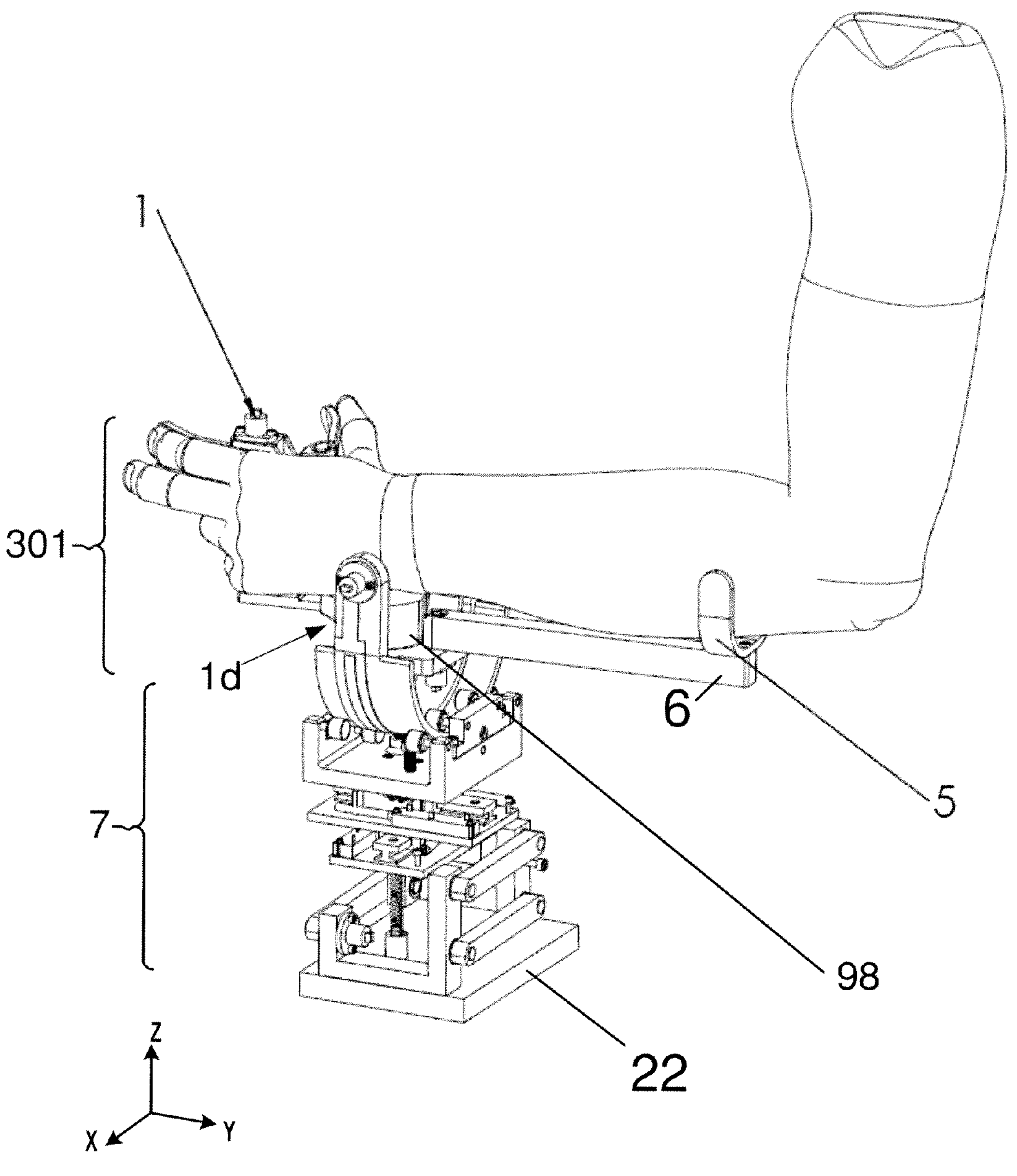
FIG. 2 illustrates an 11 degree of freedom joystick assembly with a representation of a human arm positioned to operate the joystick assembly.

As is shown in FIG. 2, the high DoF joystick is configured to allow a human arm to contact digit angle assembly 1, palm edge support 98 and forearm bracket 5. The human operator can then simultaneously control any or all of the 11 degrees of freedom demonstrated in FIGS. 3-13 using natural arm motions.

Figure 4:
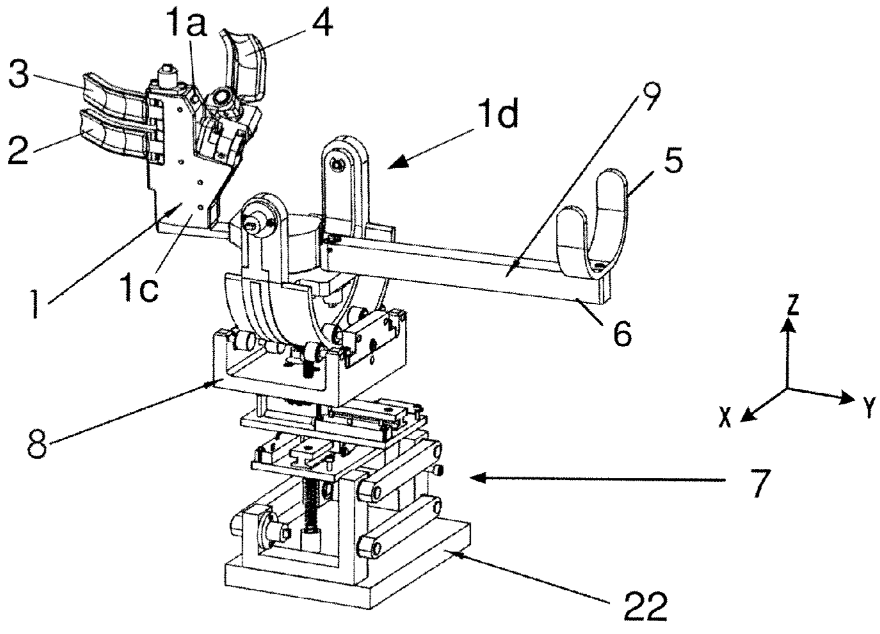
FIG. 4 illustrates an 11 degree of freedom joystick assembly with the Y degree of freedom extended to its maximum travel.
Figure 5:
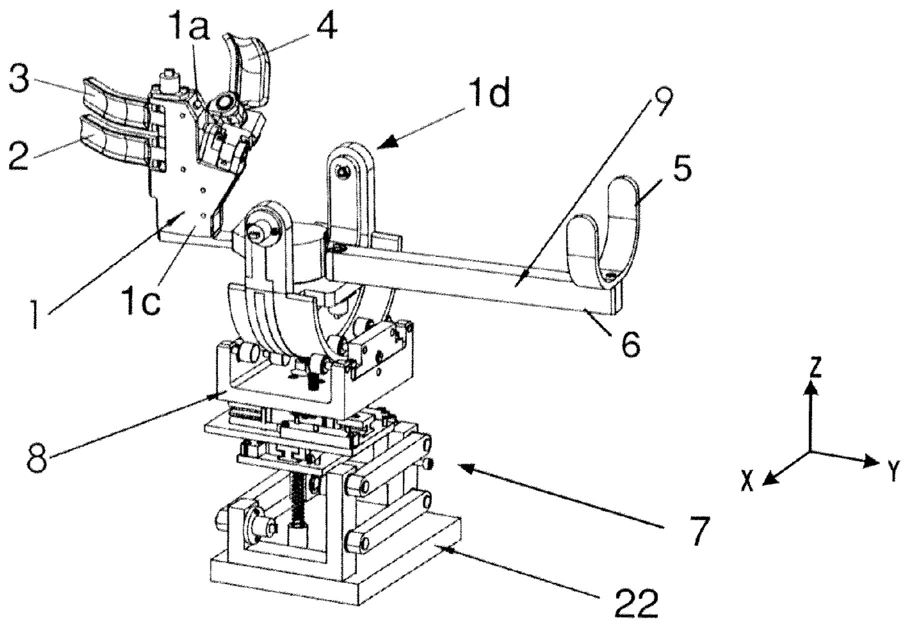
FIG. 5 illustrates an 11 degree of freedom joystick assembly with the X degree of freedom extended to its maximum travel.
Figure 15:
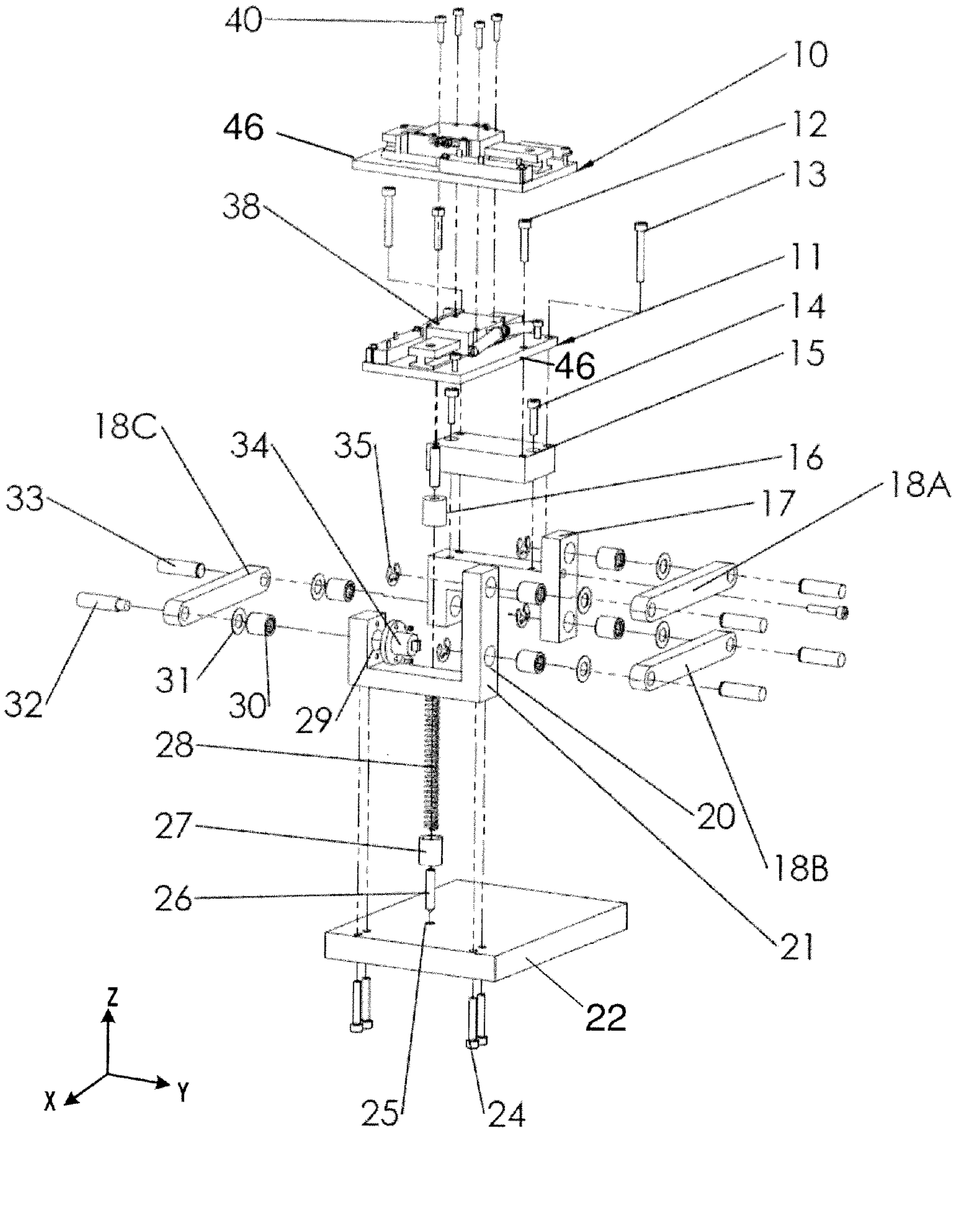
FIG. 15 illustrates an exploded view of the XYZ stage of an 11 degree of freedom joystick assembly, where the XYZ stage measures the linear travel of the X, Y, and Z degrees of freedom.

FIGS. 3A, 4, and 5 show motion of the XYZ stage 7 in the Z direction (FIG. 3A), Y direction (FIG. 4), and X direction (FIG. 5). An exploded view of XYZ stage 7 is shown in FIG. 15. XYZ stage 7 is attached to ground at base plate 22.

Motion in the Z direction is controlled by links 18A, 18B, and 18C and biasing spring 28 shown in FIG. 15. The movement of link 18C is measured by rotary potentiometer 34, is mounted to bracket 21 via hole 20 and measures the rotation of shaft 32, which in turn is pressed into link 18C and mounts to bracket 21 in rolling-element bearing 30 in holes 29. The other end of link 18C mounts via pressed-in shaft 33 to bracket 17 using a rolling-element hearing 30, a thrust washer 31, and a retaining clip 35. Links 18A and 18B similarly mount to brackets 17 and 21 using press-in shafts 33, rolling element hearings 30, thrust washers 31, and retaining clips 35. Biasing spring 28 is attached to plate 22 using cup 27 mounted on threaded stud 26, which is threaded into threaded hole 25. The top end of biasing spring 28 rests on the bottom of plate 46 of linear bearing assembly 11.

Figure 16:
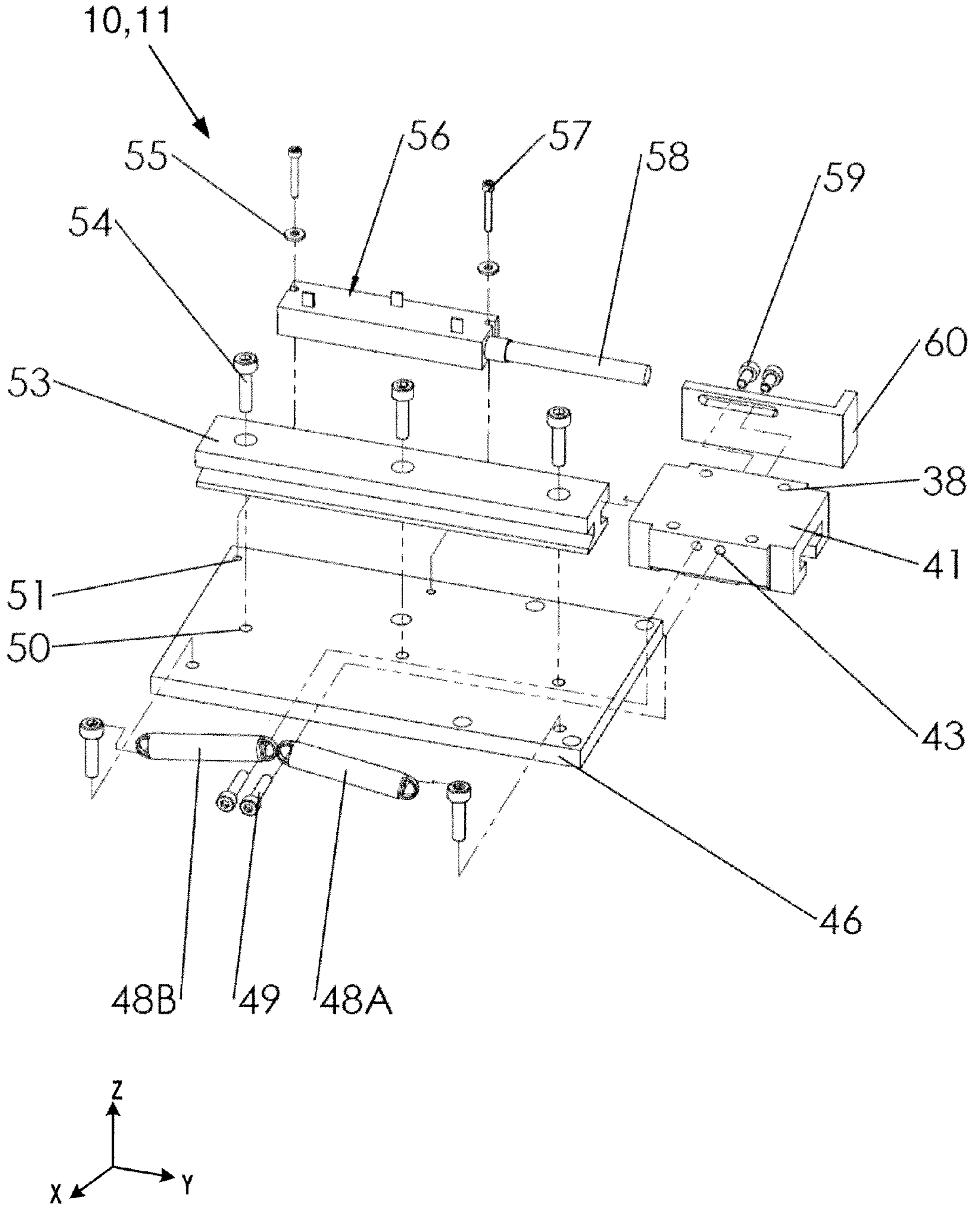
FIG. 16 illustrates an exploded view of the linear travel subassembly common to the X and Y degrees of freedom of the XYZ stage.

Motion in the X and Y directions is controlled by the linear bearing assemblies 11 and 10, respectively. An exploded view of linear bearing assembly 11 is shown in FIG. 16, and the Y direction linear bearing assembly 10 is functionally identical. Motion is controlled by linear bearing 41 moving on rail 53 and also by the centering springs 48A and 48B. The linear motion is measured by linear potentiometer assembly 56, and a spring-loaded plunger 58 acts against bracket 60. Rail 53 is mounted to a plurality of threaded holes 50 in plate 46 using a plurality of fasteners 54. Linear potentiometer assembly 56 is mounted to threaded holes 51 in plate 46 using fasteners 57 and washers 55. Bracket 60 is mounted to threaded holes 43 in linear bearing 41 using fasteners 59. Such fasteners can be screws, if desired. Centering springs 48A and 48B are mounted to fasteners 49 which are threaded into threaded holes 43 in linear bearing 41.

Linear bearing assembly 11 is attached through mounting block 15 to bracket 17 with a plurality of fasteners 12, 13, and 14. Linear bearing assembly 10 is attached to linear bearing assembly 11 with threaded fasteners 40 which are engaged with threaded holes 38 shown in FIG. 15.

Figure 6:
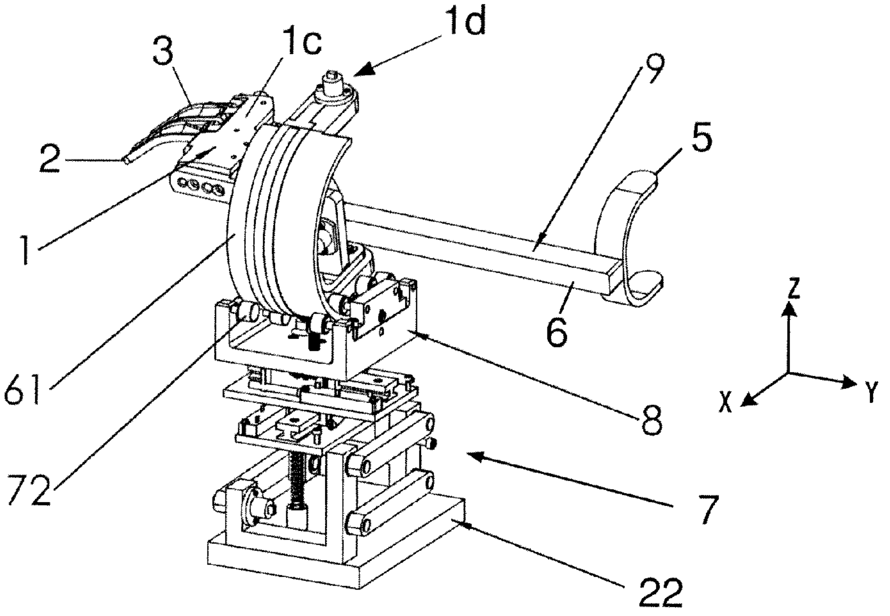
FIG. 6 illustrates an 11 degree of freedom joystick assembly with the wrist rotation degree of freedom deflected to its maximum travel.
Figure 7:
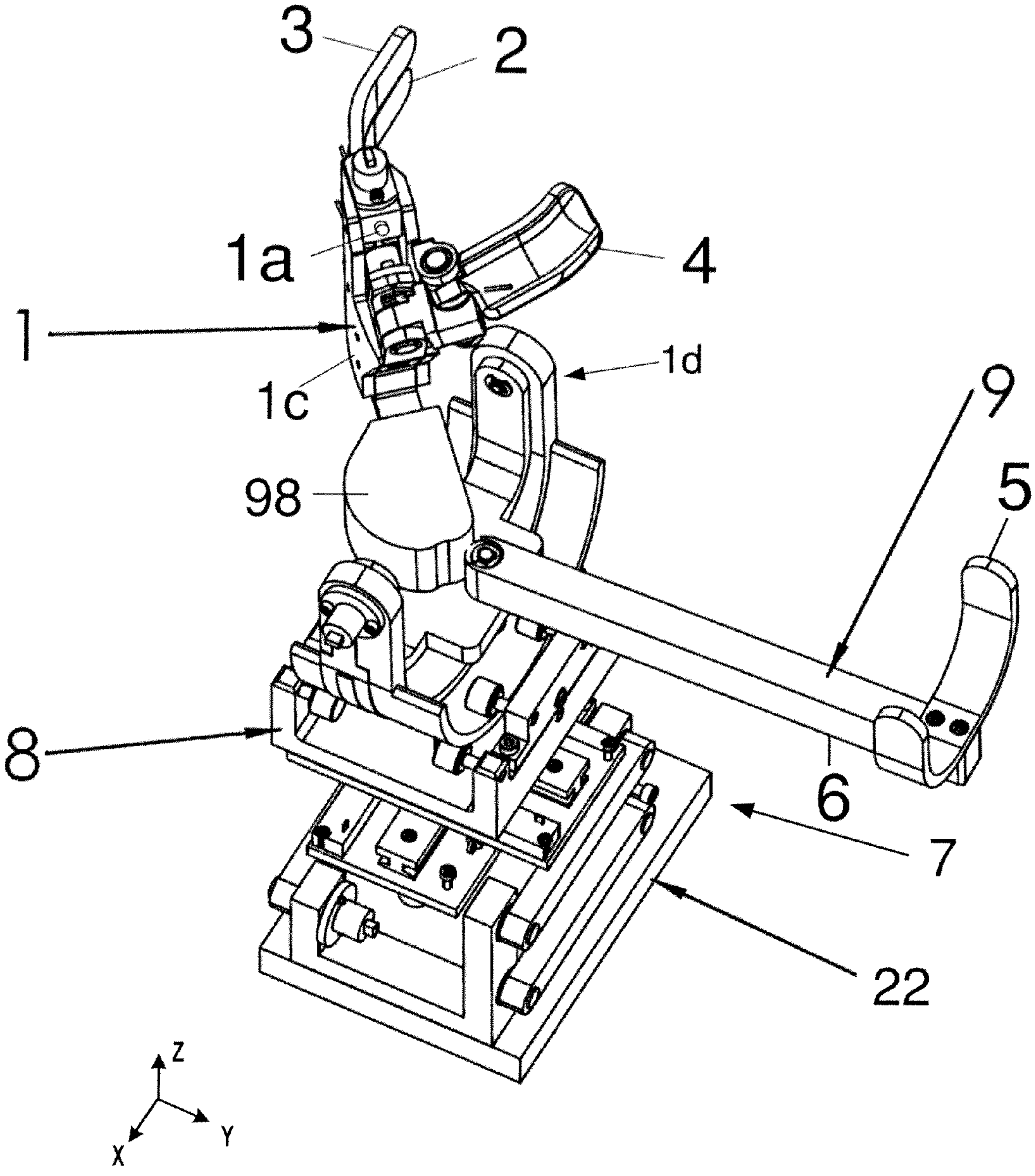
FIG. 7 illustrates an 11 degree of freedom joystick assembly with the wrist exion degree of freedom deflected to its maximum travel.
Figure 8:
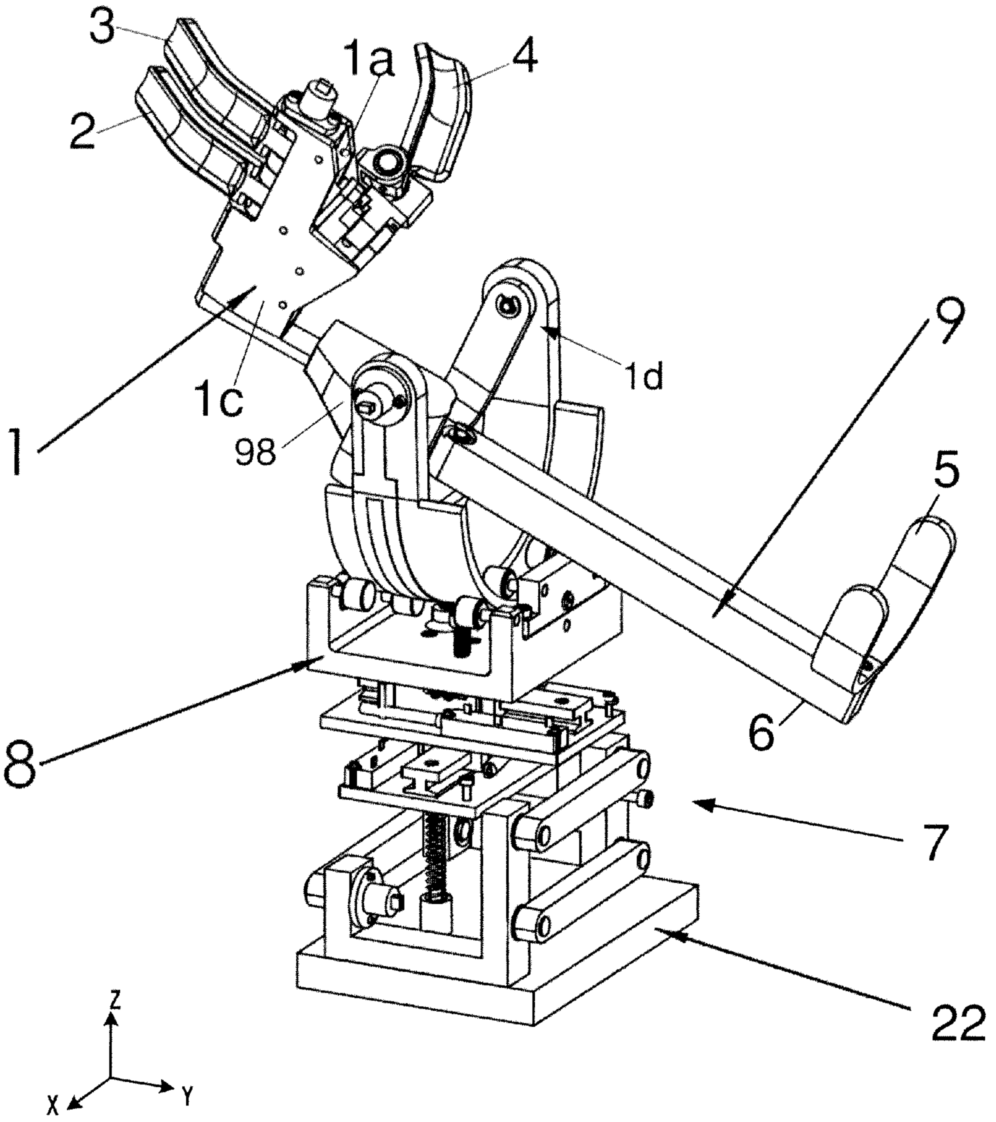
FIG. 8 illustrates an 11 degree of freedom joystick assembly with the wrist deviation degree of freedom deflected to its maximum travel.
Figure 17:
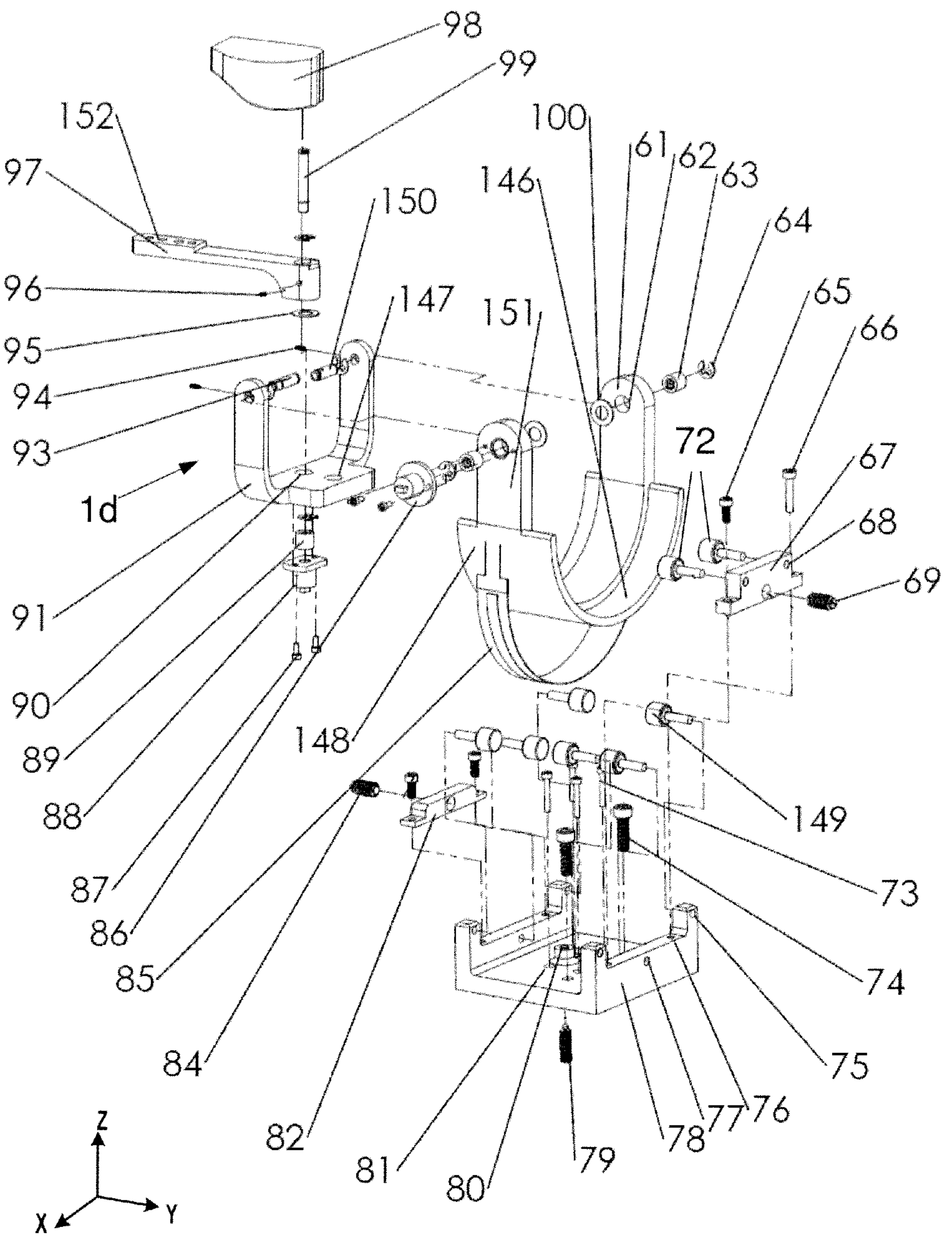
FIG. 17 illustrates an exploded view of the wrist angle stage of an 11 degree of freedom joystick assembly, where the wrist angle stage measures the deflection of the wrist rotation, flexion, and deviation degrees of freedom.

An exploded view of wrist angle stage 8 is shown in FIG. 17. FIGS. 6-8 show motion of wrist angle stage 8 in rotation about the Y axis direction via wrist rotation yoke 61 and rollers 72 and 149 (FIGS. 6 and 17), flexion with pivotal movement of a wrist pivot actuator 1*c* about the Z direction via mounting of a palm edge 98 using dowel pin 99 in hole 90 (FIGS. 7 and 17), and deviation with pivotal movement of a wrist deviation actuator 1*d* about the X direction via a u-shaped deviation yoke 91 using shaft 99 (FIGS. 8 and 17). Wrist angle stage 8 mounts to XYZ stage 7 using a plurality of threaded fasteners 73 mounted through countersunk clearance holes and engaged with threaded holes 38 in linear bearing 41 of linear bearing assembly 11.

Wrist flexion link 97 mounts to hole 90 in deviation yoke 91 using shaft 99, two retaining clips 64, thrust washer 95 and rolling element bearing 89. Shaft 99 is fixed to wrist flexion link 97 using a set screw 96 or the like. Rotary potentiometer 88 mounts to deviation yoke 91 using fasteners 87 and measures the rotation of shaft 99 (and therefore wrist flexion link 97) relative to deviation yoke 91. Palm edge support 98 can be epoxied to wrist flexion link 97.

Wrist deviation yoke 91 mounts to holes 62 in wrist rotation yoke 61 with shafts 93 and 150, two retaining clips 64 per shaft, rolling element bearings 63, and thrust washers 100. Shafts 93 and 150 can be fixed to wrist deviation yoke 91 with set screws 94. Rotary potentiometer 86 is attached to wrist rotation yoke 61 using two fasteners 87 and measures the rotation of shaft 93 (and therefore of wrist deviation yoke 91) with respect to wrist rotation yoke 61.

Cylindrical surface 148 of wrist rotation yoke 61 rests on a plurality of bottom rollers 149 which are in turn mounted in threaded holes 75 and 77 of bottom bracket 78. Top rollers 72 mount in holes 68 of bracket 67, which in turn mounts to holes threaded holes 76 in bottom bracket 78 using fasteners 65 and 66. Top rollers 72 capture surface 146 of wrist rotation yoke 61 and allow the yoke to rotate freely about the cylindrical axis of surface 146 until either of surfaces 151 contact stop members 74, which are mounted in bottom bracket 78. Ball-nose spring plungers 69 and 84 mount to brackets 67 and 82, respectively. The spring plungers 69 and 84 contact wrist rotation yoke 61 and limit motion of the yoke along the cylindrical axis of surface 146 (the Y direction). Potentiometer 85 mounts to cylindrical surface 148. Ball-nose spring plunger 79 mounts through hole 80 in bottom bracket 78; the nose of ball-nose spring plunger 79 contacts potentiometer 85, thus allowing measurement of the angular position of wrist rotation yoke 61 with respect to bottom bracket 78.

Figure 9:
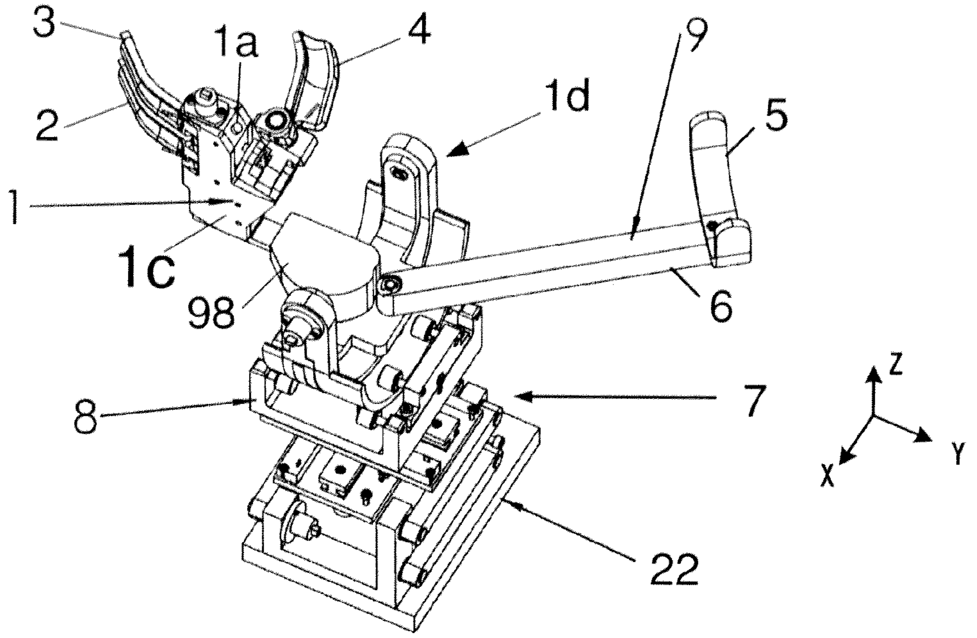
FIG. 9 illustrates an 11 degree of freedom joystick assembly with the forearm angle degree of freedom deflected to its maximum travel.
Figure 18:
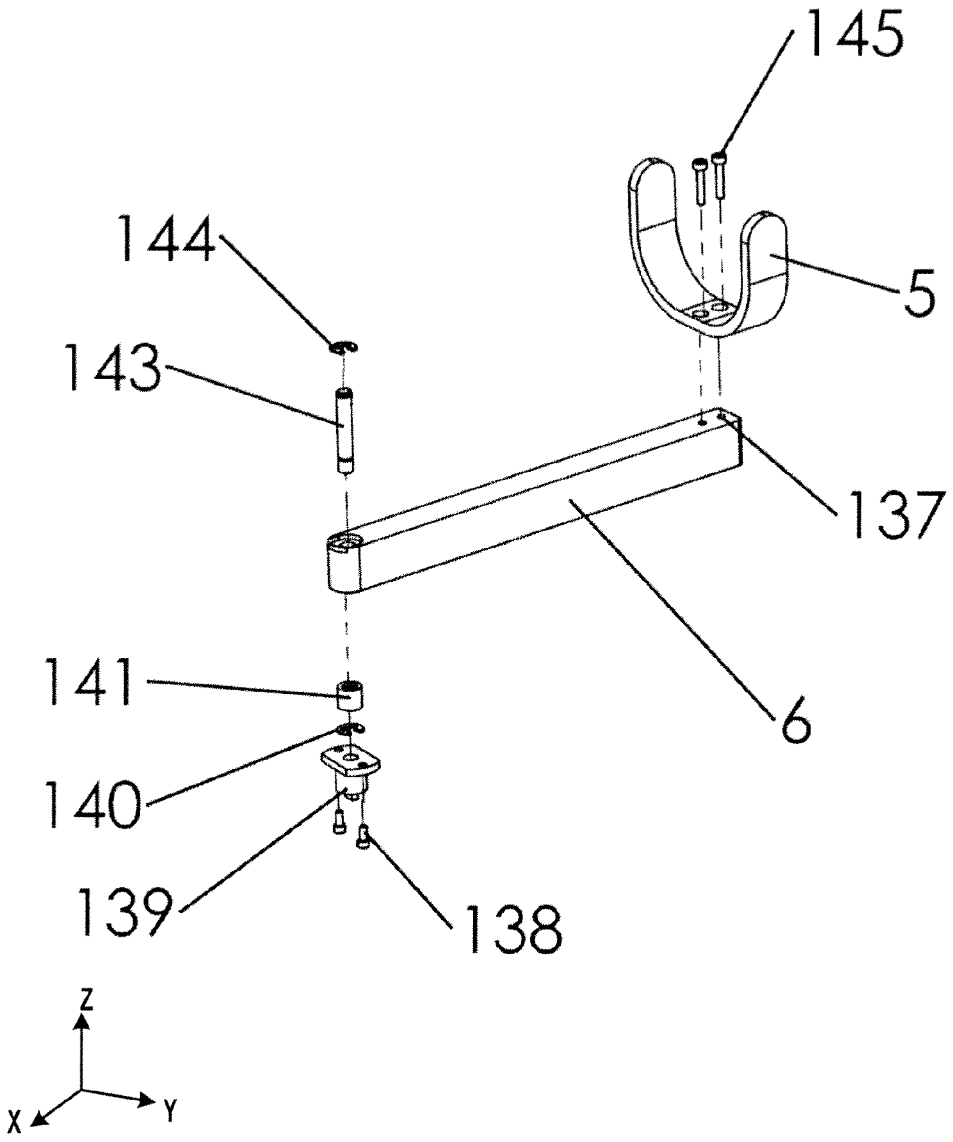
FIG. 18 illustrates an exploded view of the forearm angle stage of an 11 degree of freedom joystick assembly.

An exploded view of forearm angle stage 9 is shown in FIG. 18. FIG. 9 shows motion of forearm angle stage 9. Link 6 mounts to hole 147 in wrist deviation yoke 91 using shaft 143, retaining clips 144 and 140, and rolling-element bearing 141. Shaft 143 is fixed with respect to link 6. Rotary potentiometer 139 is attached to wrist deviation yoke 91 with fasteners 138 and measures the position of shaft 143 (and therefore link 6) with respect to wrist deviation yoke 91. Forearm support bracket 5 attaches to link 6 using threaded fasteners 145 engaging threaded holes 137.

Figure 10:
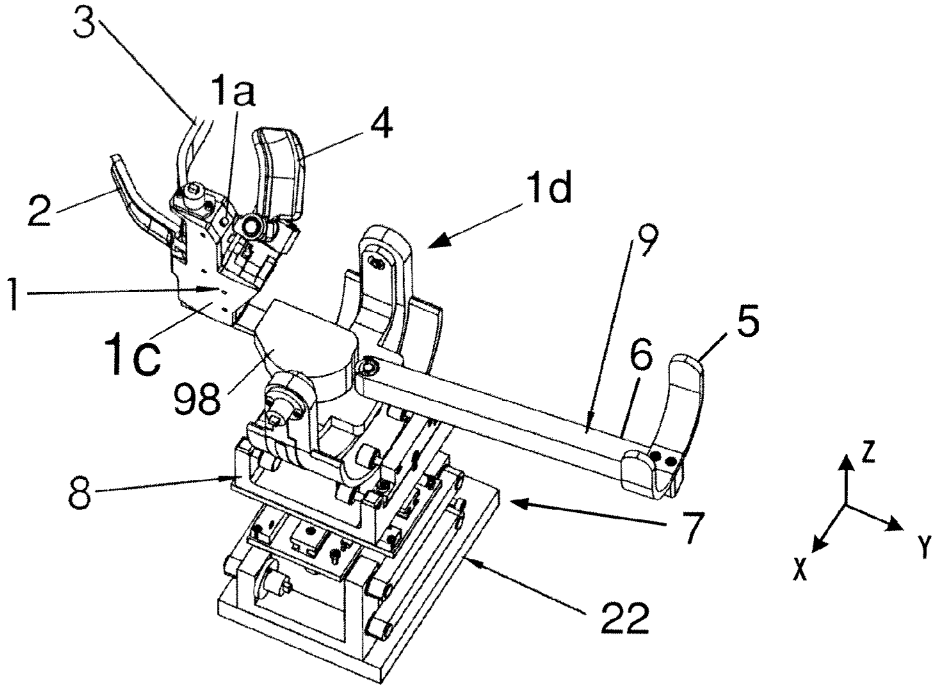
FIG. 10 illustrates an 11 degree of freedom joystick assembly with the index finger flexion degree of freedom deflected to its maximum travel.
Figure 11:
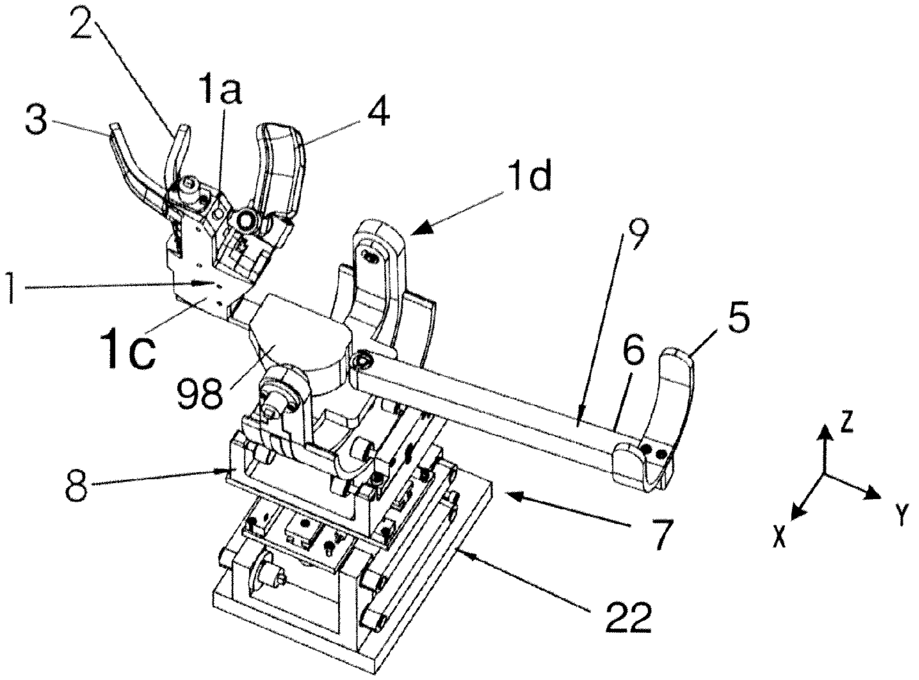
FIG. 11 illustrates an 11 degree of freedom joystick assembly with the middle finger flexion degree of freedom deflected to its maximum travel.
Figure 12:
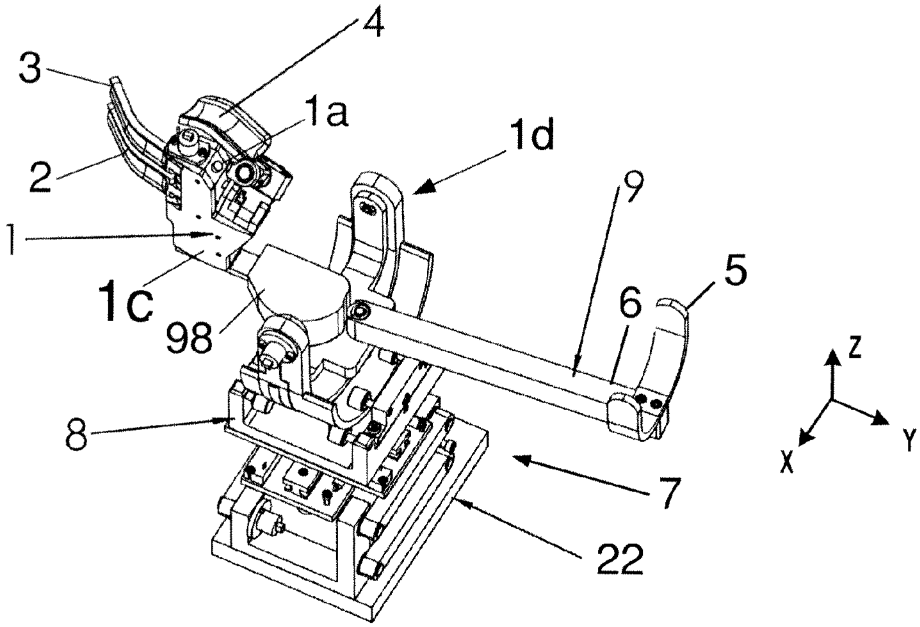
FIG. 12 illustrates an 11 degree of freedom joystick assembly with thumb flexion degree of freedom deflected to its maximum travel.
Figure 13:
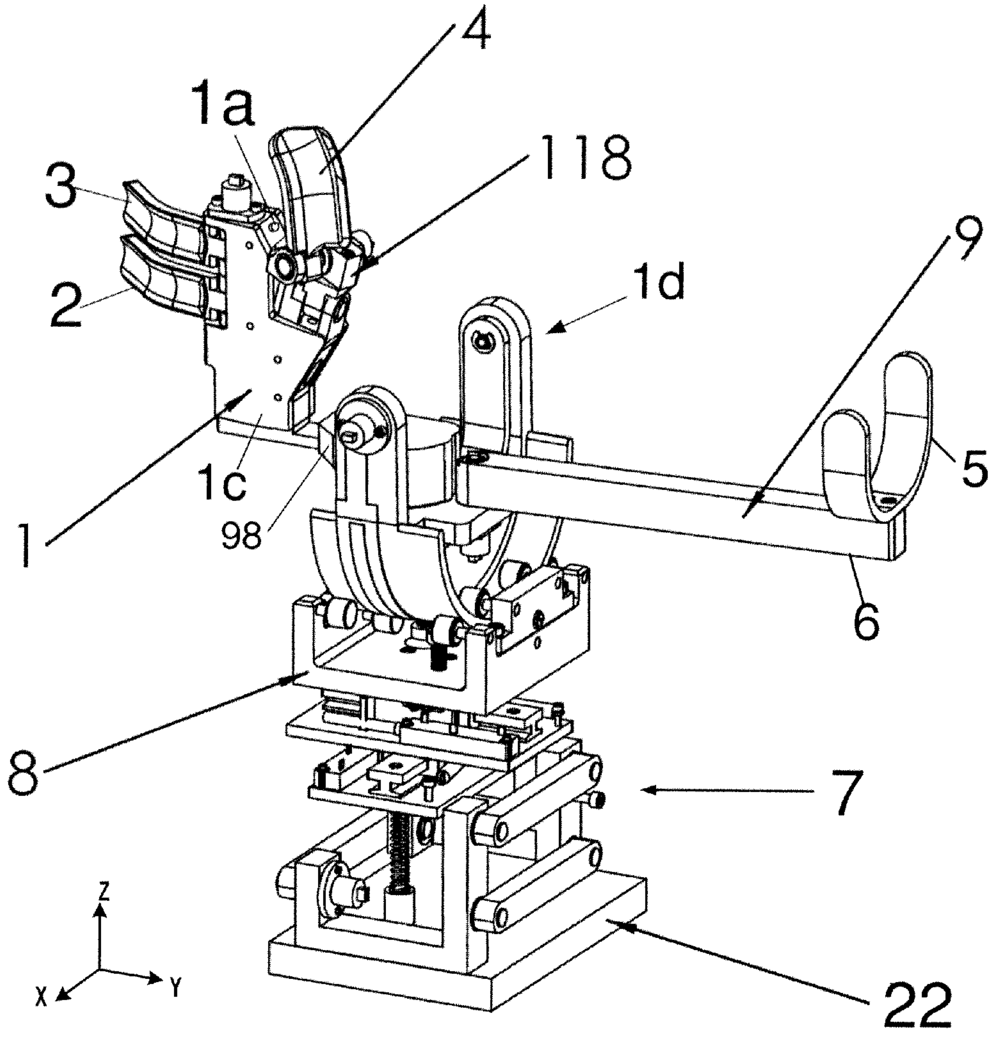
FIG. 13 illustrates an 11 degree of freedom joystick assembly with thumb rotation degree of freedom deflected to its maximum travel.
Figure 14:
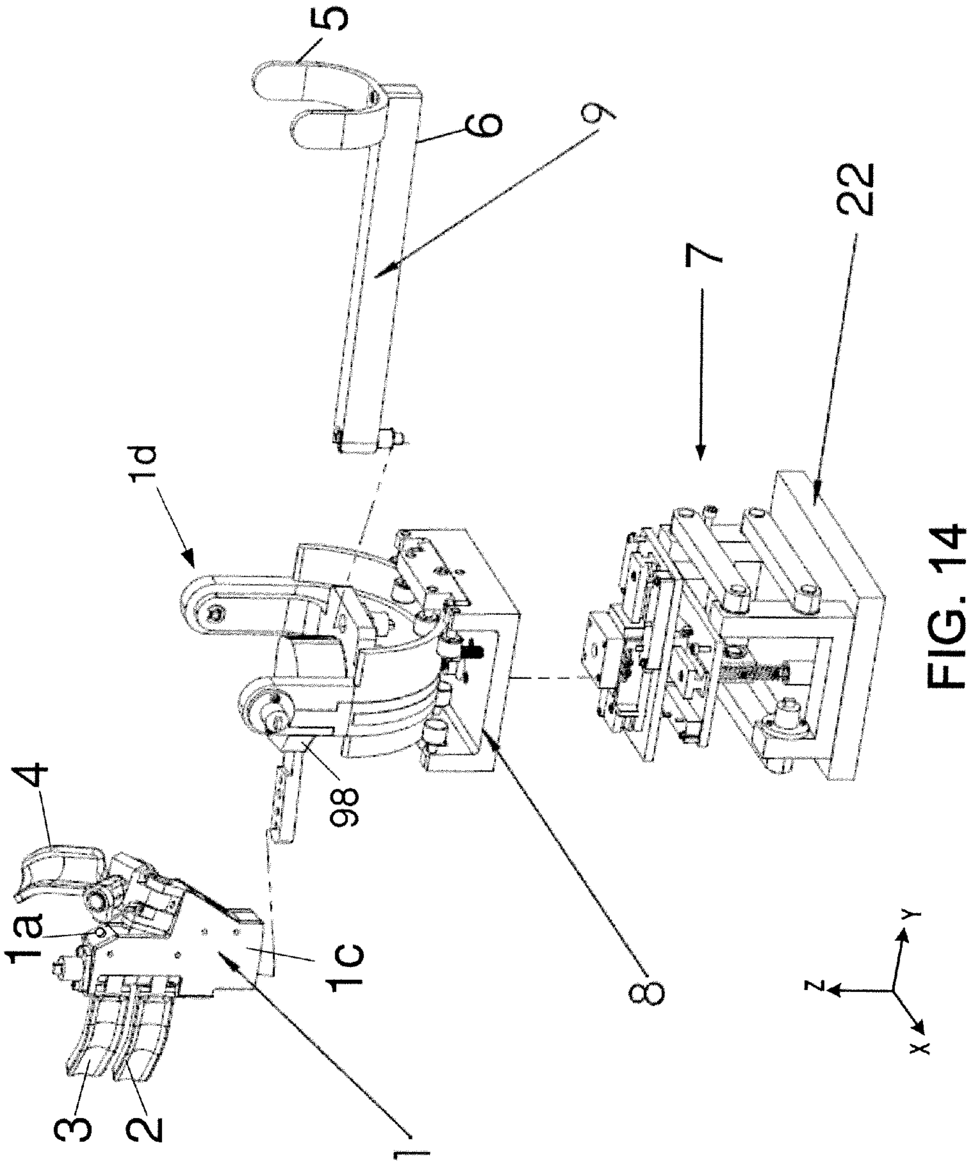
FIG. 14 illustrates an exploded view of the 4 major subassemblies of an 11 degree of freedom joystick assembly.
Figure 19:
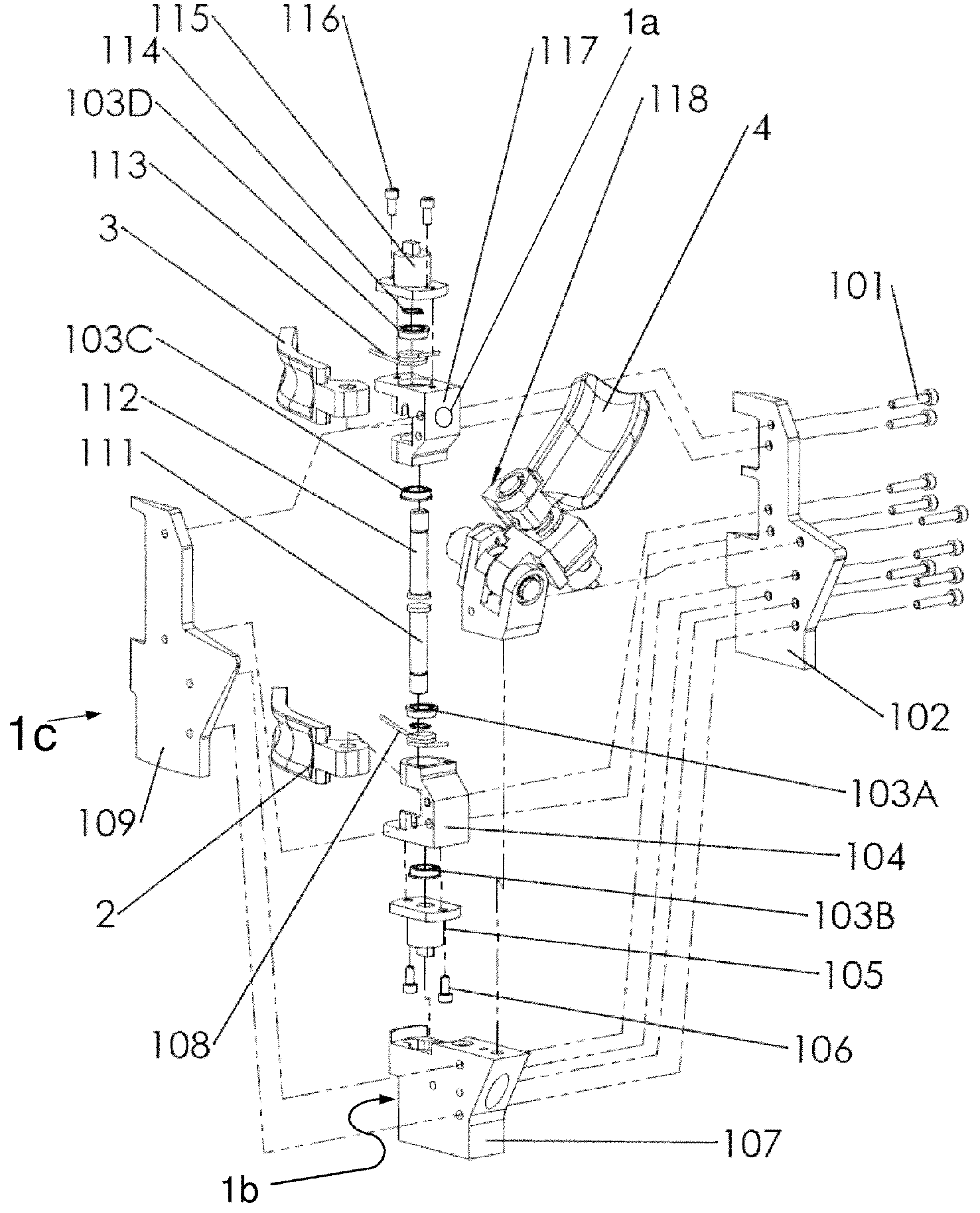
FIG. 19 illustrates an exploded view of the digit angle stage of an 11 degree of freedom joystick assembly, where the digit angle stage measures the deflection of the index finger flexion, middle finger flexion, thumb flexion, and thumb rotation degrees of freedom.

An exploded view of digit angle stage 1 is shown in FIG. 19. FIGS. 10-13 show motion of digit angle stage 1. Motion of index finger paddle 3 is shown in FIG. 10, motion of middle finger paddle 2 is shown in FIG. 11, flexion in thumb paddle 4 is shown in FIG. 12, and rotation of thumb paddle 4 is shown in FIG. 13. The digit angle stage 1 mounts to wrist flexion link 97 at holes 152. Bracket 117, bracket 104, and thumb motion subassembly 118 are joined to support plate 109, support plate 102, and bracket 107 using a plurality of fasteners 101.

Index finger paddle 3 mounts to bracket 117 with flanged shaft 112, flanged rolling-element bearings 103C and 103D, torsion return spring 113, and retaining clip 114. Shaft 112 is fixed to bracket 117 so that there is no relative motion between the two. Rotary potentiometer 115 is mounted to bracket 117 using fasteners 116 and measures the rotation of shaft 112 (and therefore index finger paddle 3) with respect to bracket 117. The toggle switch 1*a* is mounted to bracket 117.

Similarly, middle finger paddle 2 mounts to bracket 104 with flanged shaft 111, flanged rolling-element bearings 103A and 103B, torsion return spring 108, and a retaining clip 114. Shaft 111 is fixed to bracket 104 so that there is no relative motion between the two. Rotary potentiometer 105 is mounted to bracket 104 using fasteners 106 and measures the rotation of shaft 111 (and therefore middle finger paddle 2) with respect to bracket 104. The dead-man switch 1*b* is mounted on the front face of bracket 107.

Figure 20:
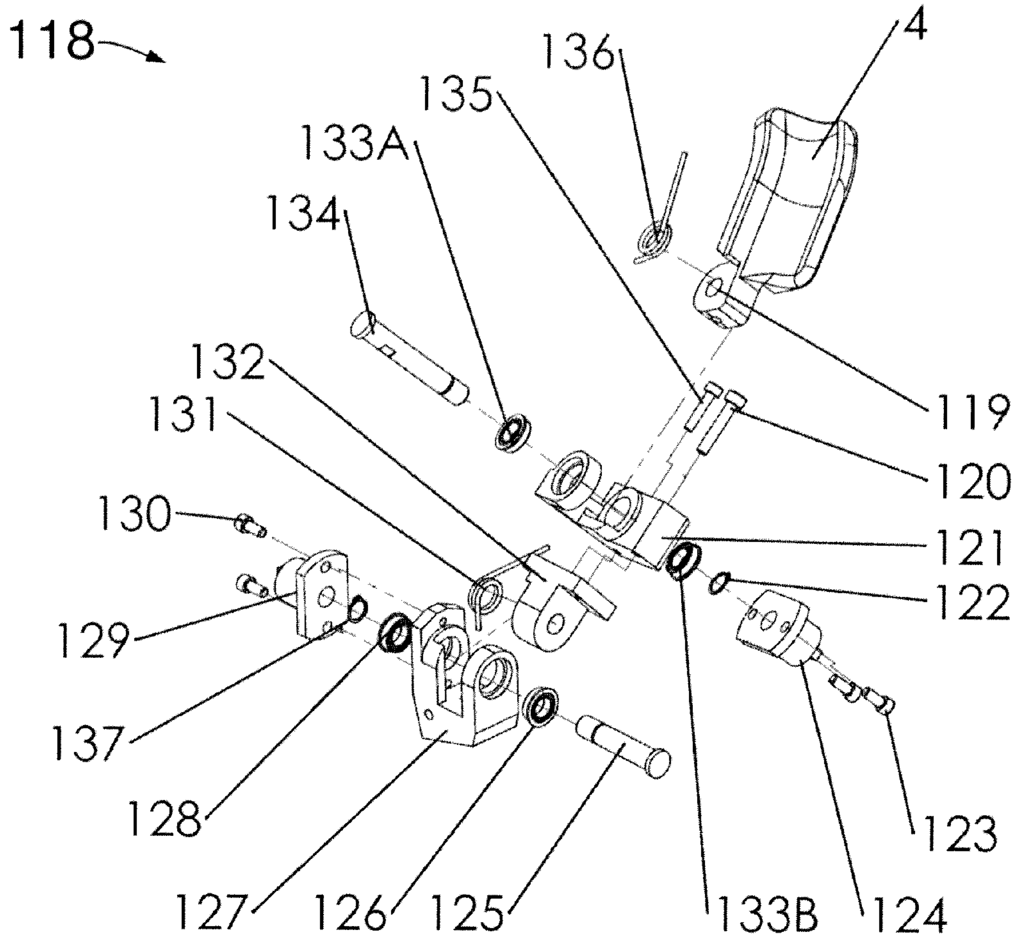
FIG. 20 illustrates an exploded view of the thumb motion subassembly of an 11 degree of freedom joystick assembly, where the thumb motion subassembly measured the deflection of the thumb flexion and thumb rotation degrees of freedom.

An exploded view of thumb motion subassembly 118 is shown in FIG. 20. Thumb paddle 4 is attached to thumb flexion bracket 121 with flanged shaft 134, flanged bearings 133A and 133B, torsion return spring 136, and retaining clip 122. Shaft 134 is fixed to thumb flexion bracket 121 so that there is no relative motion between the two. Rotary potentiometer 124 is mounted to thumb flexion bracket 121 using fasteners 123 and measures the rotation of shaft 134 (and therefore flexion of thumb paddle 4) with respect to thumb flexion bracket 121. Bracket 132 is attached to thumb flexion bracket 121 using fasteners 120 and 135. Bracket 132 is also attached to thumb rotation bracket 127 with flanged shaft 125, flanged bearings 126 and 128, torsion return spring 131, and retaining clip 137. Shaft 125 is fixed to thumb rotation bracket 127 so that there is no relative motion between the two. Rotary potentiometer 129 is mounted to thumb rotation bracket 127 using fasteners 130 and measures the rotation of shaft 125 (and therefore rotation of thumb paddle 4) with respect to thumb flexion bracket 127. It should be appreciated that the several components mentioned in the embodiments disclosed herein can be secured together by any known means for doing so, and that the components can be made from a variety of known materials. Moreover, two or more of the several components can be made of one piece, if so desired.

In operation the human operator places his or her arm on the high DoF joystick assembly as shown in FIG. 2. The operators arm contacts index finger paddle 3 with his or her index finger, middle finger paddle 2 with his or her middle finger, thumb paddle 4 with his or her thumb, support plate 109 with his or her palm, and support plate 102 with his or her ring and small fingers, palm edge support 98, and forearm bracket 5 with his or her forearm. In use, moreover, the operator may actuate one or more of the paddles using different digits, for example, operating paddle 3 using the middle finger and operating paddle 2 using the fourth (ring) finger.

By flexing and extending his or her index and/or middle fingers the operator may cause motion of index finger paddle 3 (as is shown in FIG. 10) and/or middle finger paddle 2 (as is shown in FIG. 11) without causing motion of any other degree of freedom of the high DoF joystick assembly. The torsional return springs 114 and 108 will cause index finger paddle 3 and middle finger paddle 2 to return to the fully extended position if the operator exerts no force on the paddles. In this manner the operator may move index finger paddle 3 and middle finger paddle 2 through their entire range of motion only by pushing on the paddles with a varying degree of force.

By flexing his or her thumb the operator may cause motion of thumb paddle 4 about the cylindrical axis of shaft 134 (as is shown in FIG. 12) without causing motion of any other degree of freedom of the high DoF joystick assembly. Torsional return spring 136 will cause thumb paddle 4 to return to the fully extended position if the operator exerts no force on the paddle. In this manner the operator may move thumb paddle 4 through its entire flexural range of motion only by pushing on the paddle with the ventral surface of his or her thumb with a varying degree of force.

By abducting or adducting his or her thumb the operator may cause motion of thumb paddle 4 about the cylindrical axis of shaft 125 (as is shown in FIG. 13) without causing motion of any other degree of freedom of the high DoF joystick assembly. Torsional return spring 131 will cause thumb paddle 4 to return to the fully rotated position if the operator exerts no force on the paddle. In this manner the operator may move thumb paddle 4 through its entire rotational range of motion only by pushing on the paddle with the side of his or her thumb with a varying degree of force.

With the force exerted by his or her palm acting on support plate 109, ring and small fingers on support plate 102, and palm on palm edge support 98, the operator may push away from his or her body or pull toward his or her body along the long axis of his or her forearm (assuming the operator's wrist is not flexed nor has any radial and ulnar deviation) and thus as is shown in FIG. 4 cause motion of linear bearing assembly 10 (the Y direction of XYZ stage 7) without causing motion of any other degree of freedom of the high DoF joystick assembly. In this particular case, none of the three degrees of freedom of wrist angle stage 8 will move in response to the force exerted generated by the operator because the force creates no moment about any of the axes of motion of wrist angle stage 8.

Similarly, with the force exerted by his or her palm acting on support plate 109, ring and small fingers on support plate 102, and palm on palm edge support 98, the operator may push away from his or her body or pull toward his or her body along a horizontal axis perpendicular to the long axis of his or her forearm (assuming the operator's wrist is not flexed, nor has any radial and ulnar deviation) and thus as is shown in FIG. 5 cause motion of linear hearing assembly 11 (the X direction of XYZ stage 7) without causing motion of any other degree of freedom of the high DoF joystick assembly. In this particular case none of the three degrees of freedom of wrist angle stage 8 will move in response to the force exerted generated by the operator because the force creates no moment about any of the axes of motion of wrist angle stage 8.

Also similarly, with the force exerted by his or her palm acting on support plate 109, ring and small fingers on support plate 102, and palm on palm edge support 98, the operator may push vertically downwards or pull vertically upwards along a vertical axis perpendicular to the long axis of his or her forearm (assuming the operator's wrist is not flexed nor has any radial and ulnar deviation) and thus as is shown in FIG. 3A cause motion of links 18A, 18B, and 18C (the Z direction of XYZ stage 7) without causing motion of any other degree of freedom of the high DoF joystick assembly. In this particular case none of the three degrees of freedom of wrist angle stage 8 will move in response to the force exerted generated by the operator because the force creates no moment about any of the axes of motion of wrist angle stage 8.

With the moment exerted by his or her palm acting on support plate 109 and ring and small fingers on support plate 102, the operator may pronate or supinate his or her wrist and thus cause motion of wrist rotation yoke 61 (as is shown in FIG. 6) without causing motion of any other degree of freedom of the high DoF joystick assembly. In this particular case none of the three degrees of freedom of XYZ stage 7 will move in response to the force exerted generated by the operator because the moment creates no force along any of the axes of motion of XYZ stage 7.

Similarly, with the moment exerted by his or her palm acting on support plate 109 and ring and small fingers on support plate 102, the operator may flex or extend his or her wrist and thus cause motion of wrist flexion link 97 (as is shown in FIG. 7) without causing motion of any other degree of freedom of the high DoF joystick assembly. In this particular case none of the three degrees of freedom of XYZ stage 7 will move in response to the force exerted by the operator because the moment creates no force along any of the axes of motion of XYZ stage 7.

Also similarly, with the moment exerted by his or her palm acting on support plate 109, palm on palm edge support 98 and ring and small fingers on support plate 102, the operator may cause radial and ulnar deviation of his or her wrist and thus cause motion of wrist deviation yoke 91 (as is shown in FIG. 8) without causing motion of any other degree of freedom of the high DoF joystick assembly. In this particular case none of the three degrees of freedom of XYZ stage 7 will move in response to the force generated by the operator because the moment creates no force along any of the axes of motion of XYZ stage 7.

By using his or her forearm to exert a force on forearm bracket 5 perpendicular to the long axis of forearm link 6, the operator may cause motion of forearm angle stage 9 (as is shown in FIG. 9) without causing motion of any other degree of freedom of the high DoF joystick assembly.

In addition to being able to move any individual DoF without moving other DoFs, the operator may move any combination of DoFs that she desires simultaneously or in any desired sequence.

Figure 21:
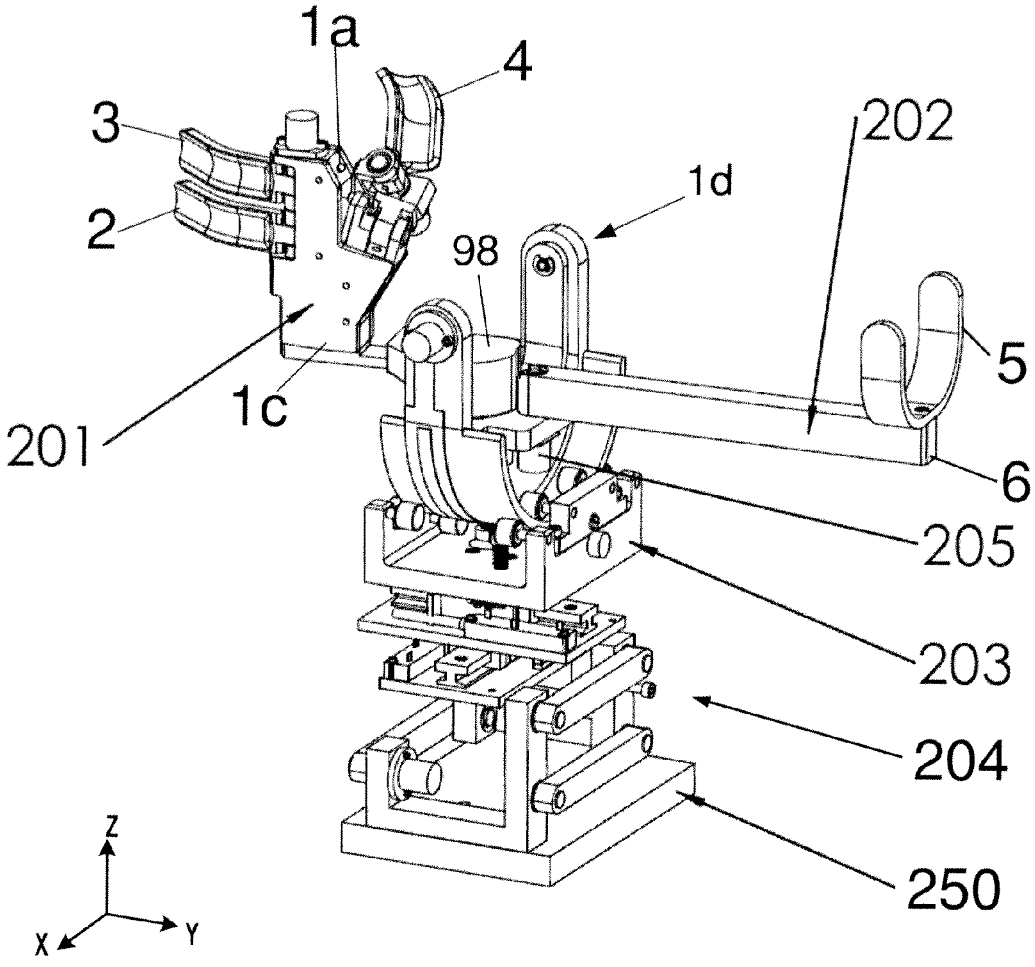
FIG. 21 illustrates an 11 degree of freedom joystick assembly with feedback actuators at each degree of freedom according to a second embodiment of the present disclosure.
Figure 22:
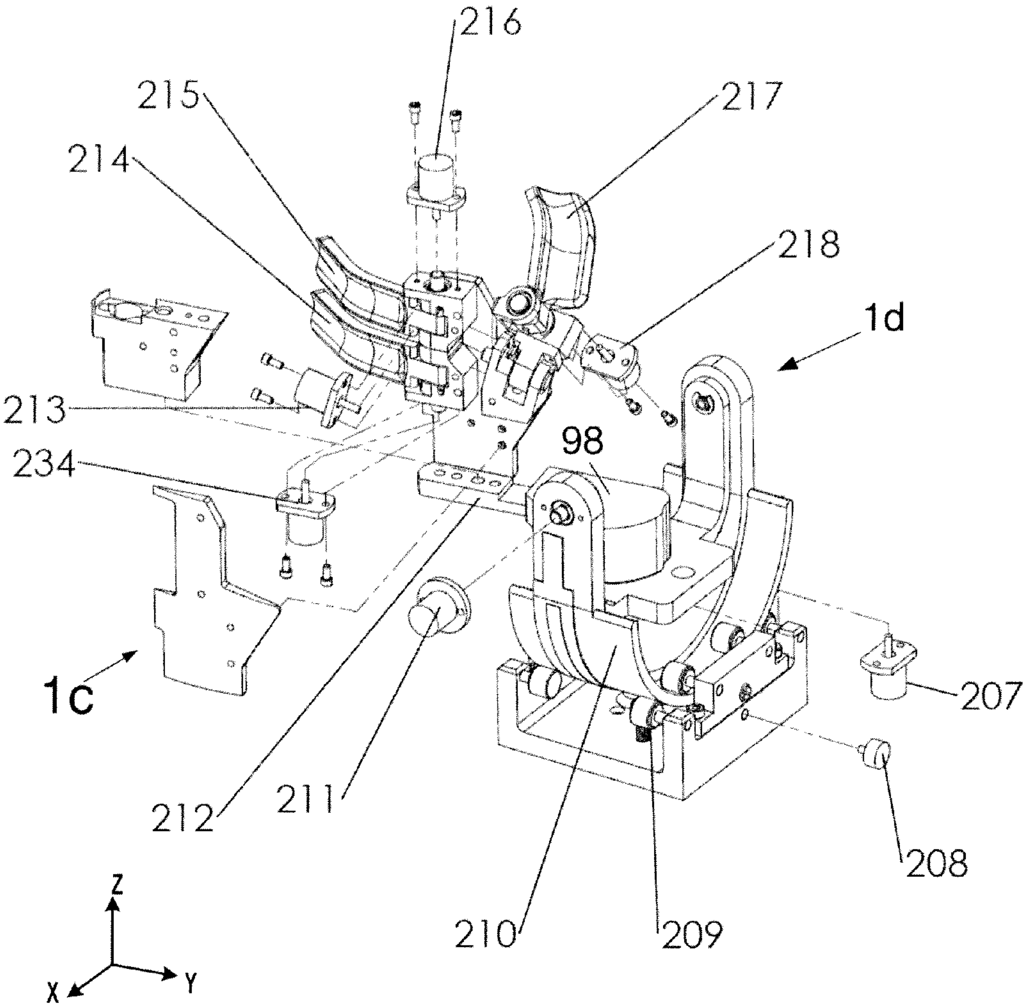
FIG. 22 illustrates a partially exploded view of the digit angle stage and the wrist angle stage of an 11 degree of freedom joystick assembly with feedback actuators at each degree of freedom.
Figure 23:
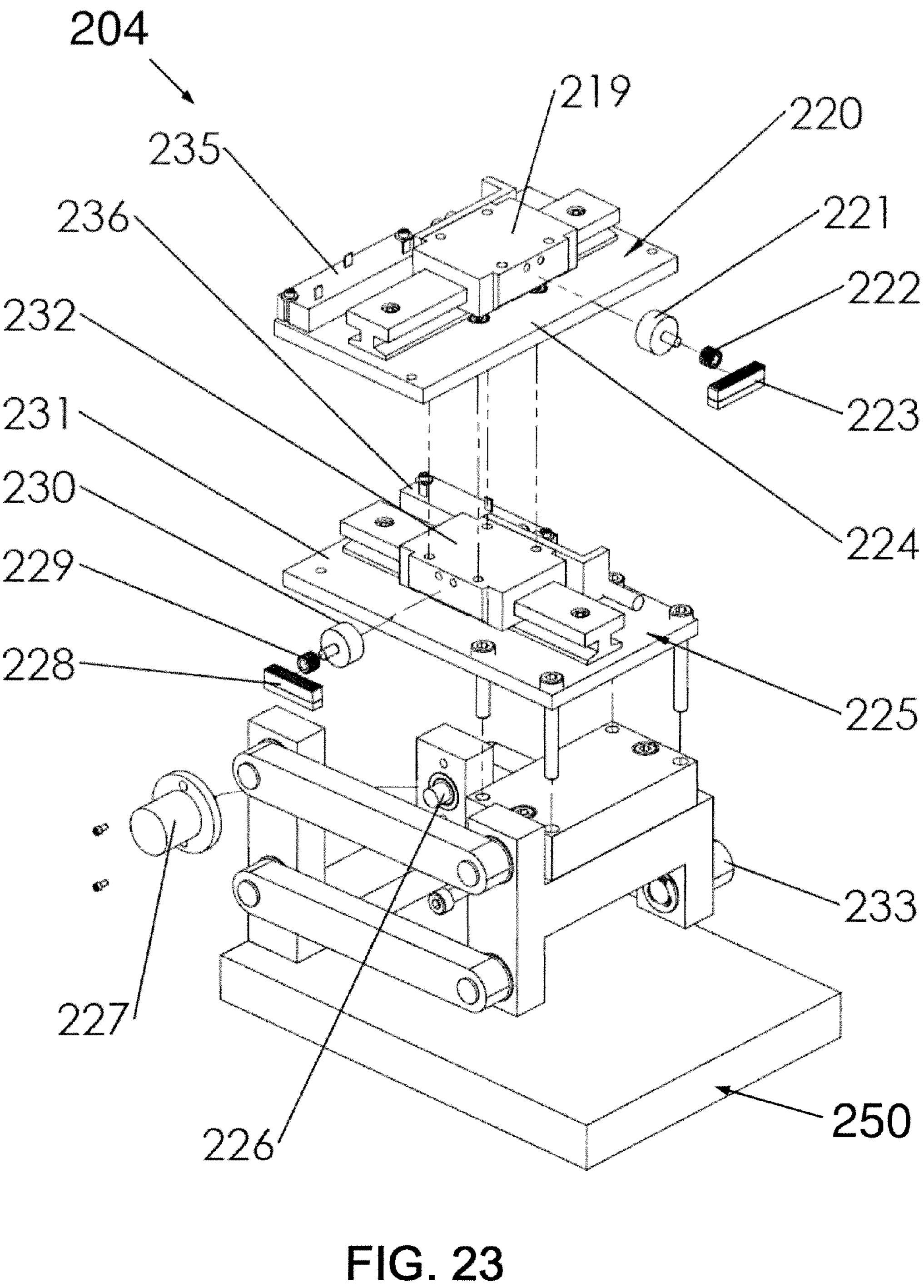
FIG. 23 illustrates a partially exploded view of the XYZ stage age of an 11 degree of freedom joystick assembly with feedback actuators at each degree of freedom.

A second embodiment of the high degree of freedom (DoF) joystick is shown in FIGS. 21-23, which differs from the first embodiment by having feedback actuators at each degree of freedom. As is shown in the drawings and particularly in FIG. 21, the joystick assembly comprises major subassemblies base 250, digit angle stage 201, XYZ stage 204, wrist angle stage 203, and forearm angle stage 202.

As is shown in FIG. 21, feedback actuator with integral position sensor 205 can exert torque on forearm angle stage 202 as well as sensing the position of forearm angle stage 202 with respect to wrist angle stage 203.

FIG. 22 shows the four feedback actuators for digit angle stage 201. In particular, feedback actuator with integral position sensing 216 can exert torque on index finger paddle 215 and feedback actuator with integral position sensing potentiometer 234 can exert torque on middle finger paddle 214. Similarly, feedback actuator with integral position sensing 218 can exert torque the flexion degree of freedom of thumb paddle 217 and feedback actuator with integral position sensing 213 an exert torque on the rotation degree of freedom of thumb paddle 217.

FIG. 22 also shows the three feedback actuators for wrist angle stage 203. In particular, feedback actuator with integral position sensing 208 drives a roller 209 that can exert torque on wrist rotation yoke 210. Feedback actuator with integral position sensing 211 can exert torque on wrist deviation yoke 210, and feedback actuator with integral position sensing 207 can exert torque on wrist flexion link 212.

FIG. 23 shows the three feedback actuators for XYZ stage 204. Motor 221 is attached to pinion gear 222 and also to linear bearing 219 of the linear bearing assembly 220 (the Y degree of freedom of XYZ stage 204). Rack 223 is attached to plate 224 of linear bearing assembly 220 and is in contact with pinion gear 222; motor 221 can thus drive pinion gear 222 and rack 223 to cause a reaction force between linear bearing 219 and plate 224. Linear motion between linear bearing 219 and plate 224 is measured by linear potentiometer 235.

Similarly, FIG. 23 shows that motor 230 is attached to pinion gear 229 and also to linear bearing 232 of the linear bearing assembly 225 (the X degree of freedom of XYZ stage 204). Rack 228 is attached to plate 231 of linear bearing assembly 225 and is in contact with pinion gear 229; motor 230 can thus drive pinion gear 229 and rack 228 to cause a reaction force between linear bearing 232 and plate 230. Linear motion between linear bearing 232 and plate 231 is measured by linear potentiometer 236.

Finally, FIG. 23 shows that feedback actuator with integral position sensing 227 is attached to shaft 226, which in turn can exert torque on output link 233, thus inducing force on the Z degree of freedom of XYZ stage 204.

In operation the human operator places his or her arm on the high DoF joystick assembly of the second embodiment in a manner identical to that of the high DoF joystick assembly of the first embodiment. Similarly, the human operator can cause motion of any or all of the degrees of freedom of the high DoF joystick of the second embodiment in any combination or sequence that she desires. During operation any or all of the feedback actuators 205, 207, 208, 211, 213, 216, 218, 221, 227, 230, and 234 can exert a force or torque on the particular degree of freedom to which the actuator is attached. Moreover, the actuation of the various components of the joystick assemblies causes generation of one or more signals or values indicating the deflection, position, speed, force, etc. associated with such actuation.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A high degree of freedom control actuator, comprising:

a base structure;

an XYZ stage mounted to the base structure and including a support structure linearly movable in three orthogonal directions provide three degrees of freedom relative to the base structure, the XYZ stage providing at least one signal or value indicative of the position of the support structure relative to the base structure in the three degrees of freedom corresponding to the three orthogonal directions; and an actuation assembly supported on the XYZ stage and movable by at least one of an operator's arm, hand, digit, and wrist relative to the XYZ stage to provide at least four additional degrees of freedom relative to the base structure, the actuation assembly operative to provide at least one signal or value indicative of the position of at least one of the operator's arm, hand, digit and wrist in the at least four additional degrees of freedom relative to the base structure, the actuation assembly comprising a wrist angle stage pivotal about a first one of three orthogonal directions relative to the XYZ stage by operator hand, forearm or wrist motion, the wrist angle stage providing at least one signal or value indicative of the pivotal position of the wrist angle stage relative to the XYZ stage with respect to rotation about the first one of the three orthogonal directions;

the actuation assembly comprising a digit angle stage, the digit angle stage comprising:

a first digit actuator movable by operator finger flexion relative to the wrist angle stage, the digit angle stage providing a first signal or value indicative of the position of the first digit actuator relative to the wrist angle stage, and a second digit actuator having a thumb paddle conformed to the operator's thumb and pivotal about a first axis relative to the digit angle stage by operator thumb flexion, the digit angle stage providing a second signal or value indicative of a pivotal position of the thumb paddle about the first axis through operator thumb flexion relative to the wrist angle stage, the thumb paddle being pivotal about a second axis, the digit angle stage providing a third signal or value indicative of a pivotal position of the thumb paddle about the second axis through operator thumb rotation relative to the wrist angle stage, the second axis being spaced from the first axis, and the second axis being orthogonal to the first axis.

2. The control actuator of claim 1, wherein the wrist angle stage is located over and above the base structure.

3. An apparatus for controlling a machine, comprising:

a base structure;

a first stage operably mounted to, and located above and over, the base structure, the first stage including a support structure linearly actuatable by an operator in a first set of three orthogonal directions relative to the base structure to provide three corresponding degrees of freedom, the first stage providing three analog signals indicative of the position of the support structure relative to the base structure in the first set of three orthogonal directions; and an actuation assembly supported on the first stage and movable by at least one of the operator's arm, hand, digit, and wrist relative to the first stage the actuation assembly comprising:

a wrist angle stage pivotal about a first one of a second set of three orthogonal directions along a direction of the operator's forearm relative to the first stage and pivotal about a second one of the second set of three orthogonal directions, the wrist angle stage providing two analog signals indicative of the pivotal positions of the wrist angle stage relative to the first stage with respect to rotation about the first and second ones of the second set of three orthogonal directions, and a digit angle stage mounted on the wrist angle stage comprising:

a first finger paddle conformed to the operator's index finger and pivotal about a first direction relative to the wrist angle stage by flexion of the operator's index finger, the digit angle stage providing an analog signal indicative of the pivotal position of the first finger paddle relative to the wrist angle stage, a second finger paddle conformed to the operator's middle finger and pivotal about the first direction relative to the wrist angle stage by flexion of the operator's middle finger, the digit angle stage providing an analog signal indicative of the pivotal position of the second finger paddle relative to the wrist angle stage, and a thumb paddle conformed to the operator's thumb and pivotal about a second direction relative to the wrist angle stage by rotation of the operator's thumb, the second direction relative to the wrist angle stage being orthogonal to the first direction relative to the wrist angle stage, the digit angle stage providing an analog signal indicative of the pivotal position of the thumb paddle about the second direction relative to the wrist angle stage, the thumb paddle being further pivotal about a third direction relative to the wrist angle stage by flexion of the operator's thumb, the third direction being orthogonal to the second direction, the digit angle stage providing an analog signal indicative of the pivotal position of the thumb paddle about the third direction relative to the wrist angle stage.

4. The apparatus of claim 3, wherein the wrist angle stage comprises a wrist rotation yoke and rollers allowing pivotal rotation of the wrist angle stage about the first one of the second set of three orthogonal directions.

5. The apparatus of claim 4, wherein the wrist angle stage comprises a palm edge structure mounted using a pin to pivot about the second one of the second set of three orthogonal directions.

6. The apparatus of claim 5, wherein the wrist angle stage is pivotal about a third one of the second set of three orthogonal directions by operator wrist deviation motion, the wrist angle stage providing an analog signal indicative of the pivotal position of the wrist angle stage relative to the first stage about the third one of the second set of three orthogonal directions.

7. The apparatus of claim 6, wherein the wrist angle stage comprises a wrist deviation actuator pivotal about the third one of the second set of three orthogonal directions via a u-shaped deviation yoke.

8. The apparatus of claim 4, wherein the wrist angle stage is pivotal about a third one of the second set of three orthogonal directions by operator wrist deviation motion, the wrist angle stage providing an analog signal indicative of the pivotal position of the wrist angle stage relative to the first stage about the third one of the second set of three orthogonal directions.

9. The apparatus of claim 8, wherein the wrist angle stage comprises a wrist deviation actuator pivotal about the third one of the second set of three orthogonal directions via a u-shaped deviation yoke.

10. The apparatus of claim 4, the digit angle stage comprising at least one dead man switch operable by operator's finger motion relative to the digit angle stage, the digit angle stage providing at least one signal or value indicative of an actuation state of the at least one dead man switch.

11. The apparatus of claim 4, the digit angle stage comprising at least one toggle switch operable by operator's thumb motion relative to the digit angle stage, the digit angle stage providing at least one signal or value indicative of an actuation state of the at least one toggle switch.

12. The apparatus of claim 3, wherein the wrist angle stage comprises a palm edge structure mounted using a pin to pivot about the second one of the second set of three orthogonal directions.

13. The apparatus of claim 12, wherein the wrist angle stage is pivotal about a third one of the second set of three orthogonal directions by operator wrist deviation motion, the wrist angle stage providing an analog signal indicative of the pivotal position of the wrist angle stage relative to the first stage about the third one of the second set of three orthogonal directions.

14. The apparatus of claim 13, wherein the wrist angle stage comprises a wrist deviation actuator pivotal about the third one of the second set of three orthogonal directions via a u-shaped deviation yoke.

15. The apparatus of claim 3, wherein the wrist angle stage is pivotal about a third one of the second set of three orthogonal directions by operator wrist deviation motion, the wrist angle stage providing an analog signal indicative of the pivotal position of the wrist angle stage relative to the first stage about the third one of the second set of three orthogonal directions.

16. The apparatus of claim 15, wherein the wrist angle stage comprises a wrist deviation actuator pivotal about the third one of the second set of three orthogonal directions via a u-shaped deviation yoke.

17. The apparatus of claim 3, the digit angle stage comprising at least one dead man switch operable by operator's finger motion relative to the digit angle stage, the digit angle stage providing at least one signal or value indicative of an actuation state of the at least one dead man switch.

18. The apparatus of claim 3, the digit angle stage comprising at least one toggle switch operable by operator's thumb motion relative to the digit angle stage, the digit angle stage providing at least one signal or value indicative of an actuation state of the at least one toggle switch.

19. The apparatus of claim 3, wherein the thumb paddle is pivotal about a first axis by rotation of the operator's thumb, wherein the thumb paddle is pivotal about a second axis by flexion of the operator's thumb, wherein the first and second axes are orthogonal to one another, and wherein the first and second axes are spaced from one another.

* * * * *